(12) United States Patent
Simatovic

(10) Patent No.: US 11,304,362 B2
(45) Date of Patent: Apr. 19, 2022

(54) APPARATUS AND METHOD FOR PLANTING TREES

(71) Applicant: Tigercat Industries Inc., Brantford (CA)

(72) Inventor: David Simatovic, Glen Morris (CA)

(73) Assignee: TIGERCAT INDUSTRIES INC., Brantford (CA)

( * ) Notice: Subject to any disclaimer, the term of this patent is extended or adjusted under 35 U.S.C. 154(b) by 0 days.

(21) Appl. No.: 16/411,966

(22) Filed: May 14, 2019

(65) Prior Publication Data
US 2019/0327917 A1    Oct. 31, 2019

Related U.S. Application Data

(63) Continuation of application No. PCT/CA2017/051436, filed on Nov. 29, 2017.
(Continued)

(51) Int. Cl.
*A01C 11/02*    (2006.01)
*A01C 5/04*    (2006.01)
(Continued)

(52) U.S. Cl.
CPC .............. *A01C 11/025* (2013.01); *A01C 5/04* (2013.01); *A01C 13/00* (2013.01); *A01G 23/046* (2013.01)

(58) Field of Classification Search
CPC ......... A01C 11/025; A01C 5/04; A01C 13/00; A01B 49/04; A01B 79/02; A01G 23/04; A01G 23/099; A01G 23/046
See application file for complete search history.

(56) References Cited

U.S. PATENT DOCUMENTS

| | | | | |
|---|---|---|---|---|
| 3,698,490 A | * | 10/1972 | King | E02F 3/7618 172/824 |
| 4,186,671 A | * | 2/1980 | Huang | A01C 5/062 111/104 |

(Continued)

FOREIGN PATENT DOCUMENTS

| | | |
|---|---|---|
| CA | 2178967 | 3/1998 |
| CA | 2704375 | 5/2011 |

(Continued)

OTHER PUBLICATIONS

Canadian Intellectual Property Office as International Searching Authority, International Search Report for PCT/CA2017/051436, dated Jan. 24, 2018.

(Continued)

*Primary Examiner* — Thomas B Will
*Assistant Examiner* — Ian A Normile
(74) *Attorney, Agent, or Firm* — Amarok IP Inc.; Neil W. Henderson

(57) ABSTRACT

A method and system for planting seedlings including a seedling handling system, a seedling chute system and a planting head. The seedling handling system retrieves the seedlings and then the seedling chute system transfers the seedlings from the seedling handling system to the planting head which then plants the seedlings. The method includes retrieving a row of seedlings and then delivering the row of seedlings to the planting head for individual planting of the seedlings. The method and system provide for continuous tree planting.

19 Claims, 33 Drawing Sheets

Related U.S. Application Data

(60) Provisional application No. 62/579,466, filed on Oct. 31, 2017, provisional application No. 62/427,212, filed on Nov. 29, 2016.

(51) Int. Cl.
*A01C 13/00* (2006.01)
*A01G 23/04* (2006.01)

(56) References Cited

U.S. PATENT DOCUMENTS

| | | | |
|---|---|---|---|
| 4,323,019 A | 4/1982 | Haddock | |
| 4,403,427 A * | 9/1983 | Dahlquist | A01G 23/046 111/101 |
| 4,443,151 A * | 4/1984 | Armstrong | A01C 11/025 414/404 |
| 4,574,715 A * | 3/1986 | Dietrich, Sr. | A01C 23/025 111/123 |
| 4,854,075 A * | 8/1989 | Greiling | A01G 9/0295 47/73 |
| 5,209,170 A * | 5/1993 | Kobayashi | A01C 11/025 111/105 |
| 5,784,984 A * | 7/1998 | Mikawa | A01C 11/025 111/105 |
| 5,842,306 A * | 12/1998 | Onosaka | A01C 11/025 47/1.01 R |
| 5,911,631 A * | 6/1999 | Bouldin | A01G 9/086 47/1.01 R |
| 6,615,753 B1 * | 9/2003 | Culley | A01B 13/00 111/105 |
| 2006/0130720 A1 * | 6/2006 | Parrein | A01C 11/025 111/105 |
| 2007/0033839 A1 * | 2/2007 | Jarvinen | A01G 23/065 37/302 |
| 2018/0242515 A1 * | 8/2018 | Yajima | A01C 7/105 |

FOREIGN PATENT DOCUMENTS

| | | | | |
|---|---|---|---|---|
| CN | 2472469 | * | 1/2002 | A01C 11/02 |
| CN | 204860017 | * | 12/2015 | A01C 11/02 |
| FR | 2575030 A1 | * | 6/1986 | A01C 11/02 |
| FR | 2987222 | | 8/2013 | |

OTHER PUBLICATIONS

Canadian Intellectual Property Office as International Searching Authority, Written Opinion for PCT/CA2017/051436, dated Jan. 24, 2018.

English translation of Abstract of FR2987222, retrieved from Espacenet May 10, 2019.

* cited by examiner

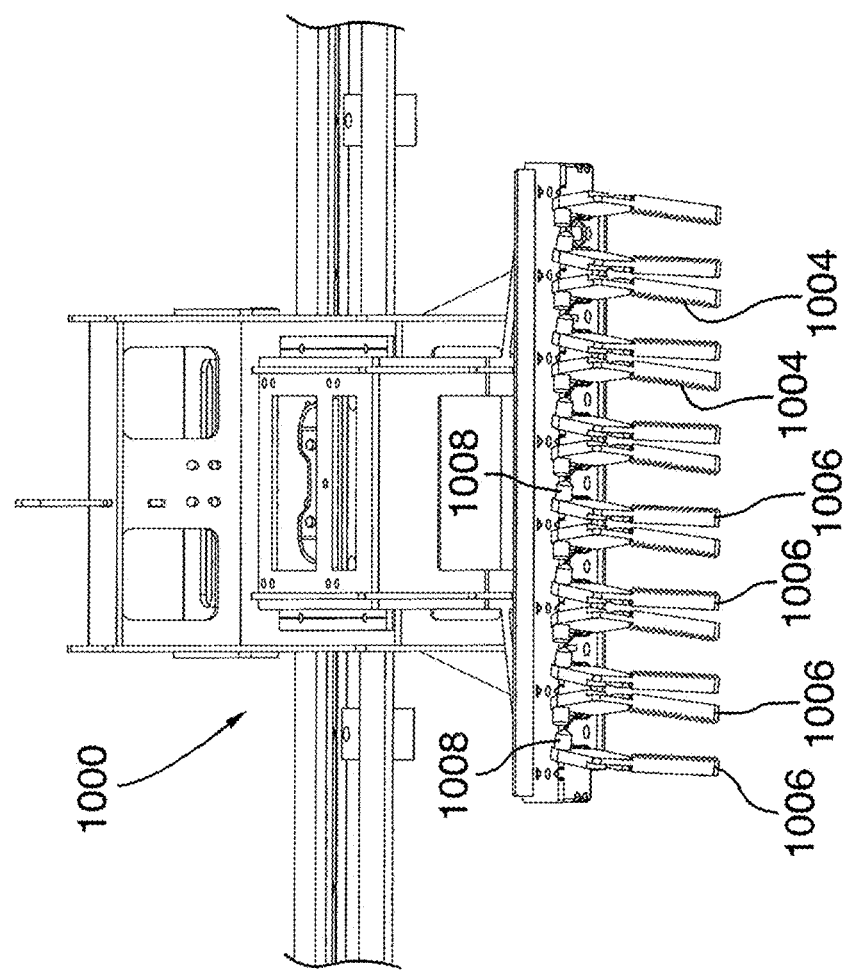

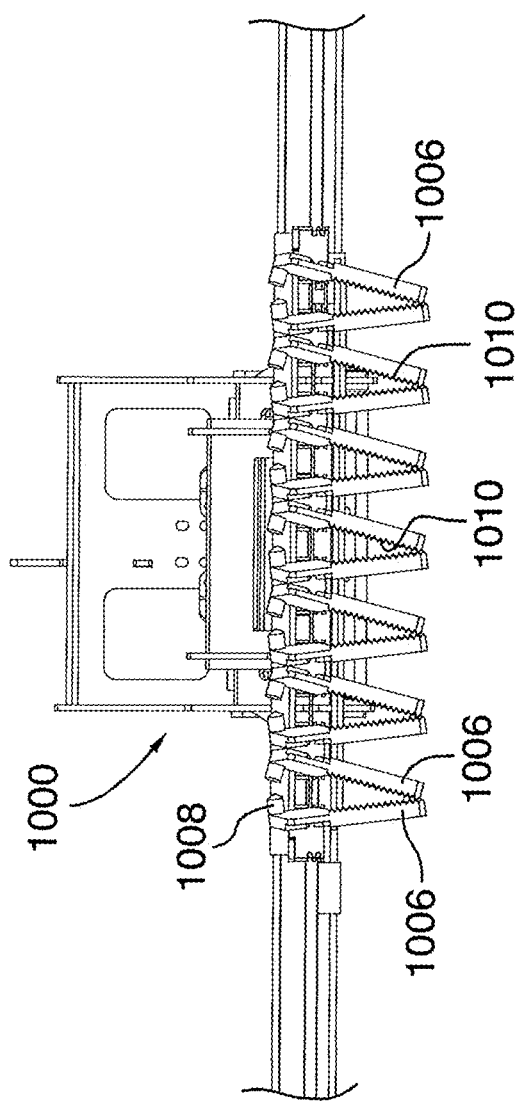

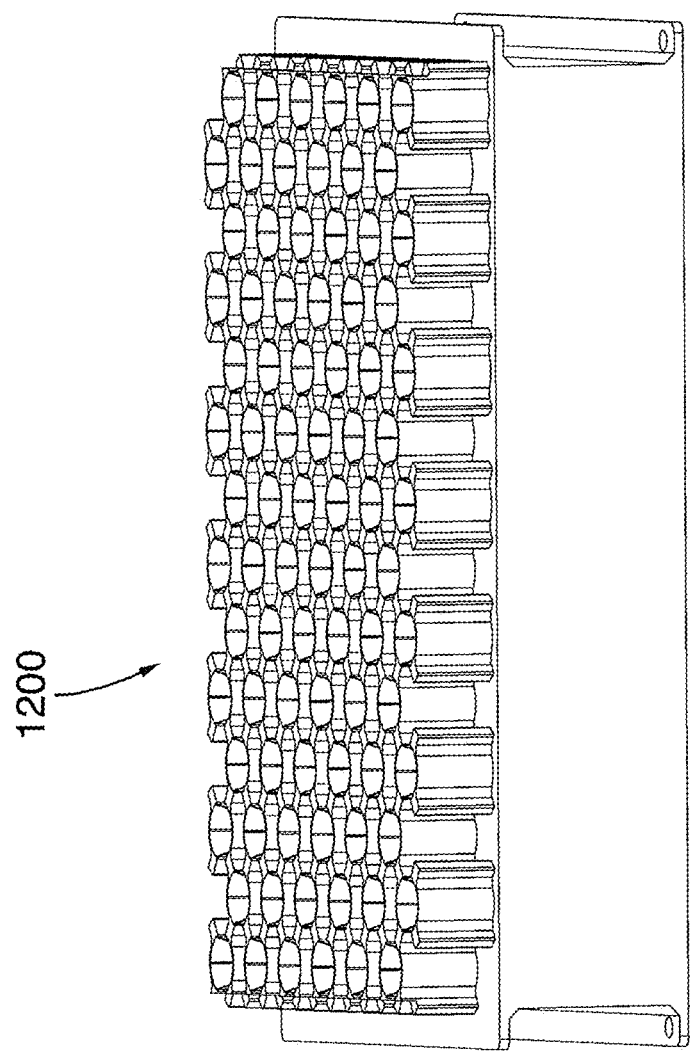

APPARATUS AND METHOD FOR PLANTING TREES

CROSS-REFERENCE TO RELATED APPLICATIONS

The current application claims priority from U.S. Provisional Ser. No. 62/427,212, filed Nov. 29, 2016, and U.S. Provisional Ser. No. 62/579,466, filed Oct. 31, 2017, which are hereby incorporated by reference.

FIELD OF THE DISCLOSURE

The disclosure is directed generally at agricultural products and, more specifically, at an apparatus and method for planting trees.

BACKGROUND OF THE DISCLOSURE

In the forestry industry it is common to plant new trees to replace trees that have been harvested. In the past, new trees tended to be manually planted, which is very labour intensive, can be slow, and the reliability may not be consistent.

Over the years, there have been attempts to provide automated systems for planting trees. Frequently, these solutions have been hybrid solutions providing some automation but may still require substantial human involvement. For example, some systems combine manual planting with automated delivery of saplings. More automated solutions have included a planting arm or similar system provided to a piece of equipment. These solutions often sacrificed correct planting for speed. Although the planting is automated, seedlings were still required to be frequently reloaded and the cost of parts and repairs is significantly high.

It is, therefore, desirable to provide an improved apparatus and method for planting trees.

SUMMARY OF THE DISCLOSURE

In a first aspect, the present disclosure provides an apparatus for planting trees.

In a second aspect, the present disclosure provides a method for planting trees.

In a third aspect of the disclosure, there is provided an apparatus for planting seedlings including a planting head for planting the seedlings; a seedling handling system; and a seedling chute system; wherein seedlings are transferred from the seedling handling system to the planting head, via the seedling chute system, for automated individual planting of the seedlings by the planting head.

In another aspect, the apparatus further includes a frame portion for mounting the planting head to a vehicle, the frame portion including a mounting apparatus and a set of supports, each of the set of supports connected at one end to the mounting apparatus and at an opposite end to the planting head. In another aspect, the set of supports are connected via spherical bushings to the mounting apparatus. In a further aspect, the set of supports are connected to the planting head via spherical bushings.

In yet a further aspect, the planting head includes a bladed pocket including a set of retractable blades and a body; wherein when the bladed pocket is in a closed position, the set of retractable blades and the body form a substantially continuous perimeter to hold a seedling and when the bladed pocket is in an open position, the set of retractable blades and the body retract relative to each allow allowing the seedling to pass through the bladed pocket. The planting head may further include at least one tamper portion. In another aspect, the planting head further includes a set of pumps for controlling the retractable blades. In another aspect, the planting head also includes a set of pumps for controlling the at least one tamper portion. The set of pumps may be pneumatic or hydraulic pumps.

In yet another aspect, the seedling handling system includes a set of chambers for receiving a set of seedling trays, wherein the set of seedling trays house a set of seedlings arranged in individual rows within each seedling tray. In a further aspect, adjacent rows within each seedling tray are offset with respect to each other. In yet a further aspect, the set of chambers are controlled by a control system to position a new seedling tray in a loading position once a previous seedling tray is emptied.

In another aspect, the seedling chute system includes a loader including a robotic arm; a set of gripping mechanisms attached to the robotic arm; and a sliding mechanism allowing the loader to move with respect to the set of chambers to retrieve the row of seedlings. In a further aspect, the gripping mechanisms include a pair of finger portions; and an apparatus for moving the pair of finger portions towards and away from each other.

In yet a further aspect, the apparatus further includes a ripping blade. In another aspect, the apparatus further includes at least one soil fracturing disc. In yet another aspect, the apparatus further includes a set of fertilizer blades. In another aspect, the set of fertilizer blades is integrated with the ripping blade. In yet another aspect, the apparatus includes a water delivery system.

In a fourth aspect of the disclosure, there is provided a method of planting seedlings including retrieving a row of seedlings for planting; delivering one of the seedlings from the row of seedlings to a planting head; planting the seedling; determining if there are any more seedlings from the row of seedlings for planting; and delivering a next seedling for planting if there are more seedlings or retrieving a new row of seedlings for planting if there are no more seedlings.

Other aspects and features of the present disclosure will become apparent to those ordinarily skilled in the art upon review of the following description of specific embodiments in conjunction with the accompanying figures.

DESCRIPTION OF THE DRAWINGS

Embodiments of the present disclosure will now be described, by way of example only, with reference to the attached Figures.

FIGS. 15a to 15c are perspective views of another embodiment of a loader;

FIGS. 16a to 16e are various views of another embodiment of a seedling tray;

DETAILED DESCRIPTION OF THE EMBODIMENTS

Generally, there is provided an apparatus and method for planting trees. It is intended that the apparatus and method provide for continuous tree planting. Herein, "continuous tree planting" refers to planting trees (e.g. seedlings) with an apparatus such that the apparatus continuously advances during planting. In the embodiments described below, a planting head of the apparatus intermittently contacts the ground to plant each seedling as the apparatus continually advances. The intermittent contact between the planting head and the ground is such that the planting head contacts the ground to plant a seedling and minimally disturbs or does not disturb the soil between adjacent seedlings when it is not in contact with the ground. The apparatus may also include a seedling handling system, which may hold a high capacity of seedlings in a standard tray format. The apparatus is intended to provide for robust planting that may be used in various environments.

It is intended that the method for planting trees includes loading a seedling handling system with standard capacity seedlings to be planted. A loader loads the seedlings from the seedling handling system to a seedling chute system. The seedling chute system feeds the seedlings to a planting head that is adapted to plant the seedlings while the planting apparatus continues moving to the next planting location. In one embodiment, the planting apparatus is mounted to a vehicle.

Figure 1:
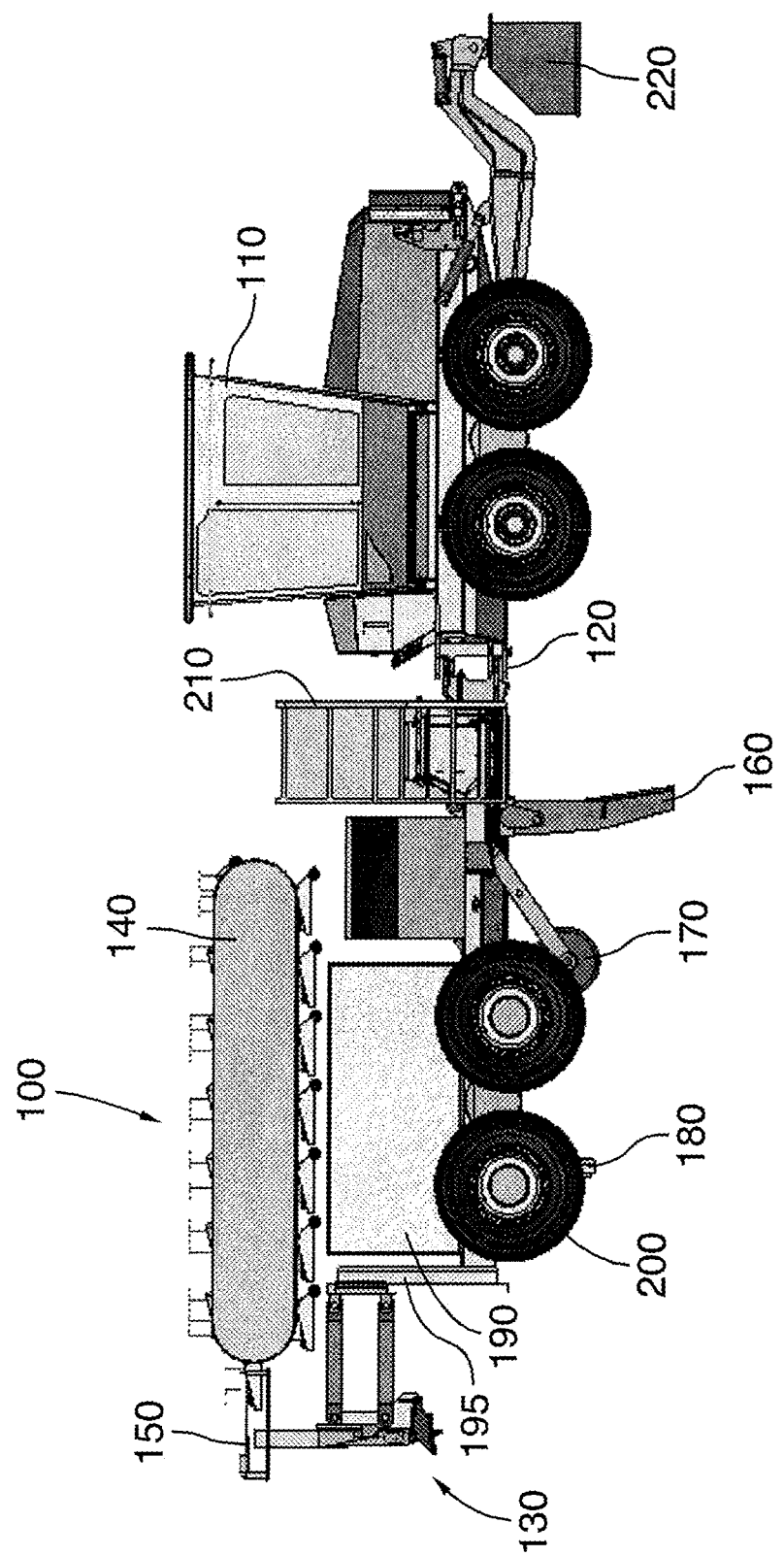
FIG. 1 illustrates an apparatus for planting trees according to an embodiment.

FIG. 1 illustrates an apparatus 100 for planting trees. The apparatus may be connected to a tractor 110 or other towing vehicle via an attachment mechanism 120. In one embodiment, the attachment mechanism may be a hitch or the like. Alternatively, the apparatus 100 may be mounted to the tractor or towing vehicle. The apparatus 100 may further include a water irrigation tank or system 190 (or a water delivery system) for performing various tasks such as, but not limited, watering the seedlings after they are planted, flushing and/or cleaning various parts of the apparatus and other components that go into or contact the ground and/or to mist or hydrate the seedlings in the seedling handling system.

In one embodiment, the apparatus 100 includes a planting head 130, a seedling handling system 140, and a seedling chute system 150. The apparatus 100 may further include a ripping blade 160, at least one soil fracturing disc 170 and fertilizing blades 180. Although shown separately in FIG. 1, the fertilizing blades 180 may be integrated with the ripping blade 160.

The ripping blade 160 operates to loosen the soil as the tractor 110 drives over the ground where the seedlings are to be planted. The loosening of the soil assists to establish an area for the tap root of the seedling, or tree, to be planted to improve the resistance to drought of the newly planted seedlings. The at least one soil fracturing disc 170 operates to replace some of the soil that was removed by the ripping blade 160 but, preferably, does not fill up the area where the soil was loosened. The at least one soil fracturing disc 170 may also break up the top soil to improve root penetration of the seedling. The fertilizing blades 180 provide fertilizer to the area where the seedling or seedlings are to be planted (or, in other words, where the soil was loosened) to provide nourishment to the seedling and the soil.

The water tank 190 is preferably integrated within a support system 195 that provides support to the planting head 130, seedling handling system 140 and seedling chute system 150. The apparatus 100 may include wheels 200. In some embodiments, the apparatus 100 may further include a retractable ladder 210 or other access mechanism in order to allow an operator to access the seedling handling system 140 and other parts of the apparatus 100.

In this example embodiment, the tractor 110 (or system) may include a surface clearing blade 220 that is connected to the front of the tractor 110. The surface clearing blade 220 operates to clear the loose soil and debris in front of the tractor 110 as the tractor moves forward. In one embodiment, the surface clearing blade 220 pushes the soil and/or debris away from the path of the tractor 110. The apparatus 100 is intended to provide for a fully automated tree planting system. The apparatus is intended to be sufficiently robust in order to operate in various environments, for example, bumpy or rocky terrain and the like.

Figure 2:
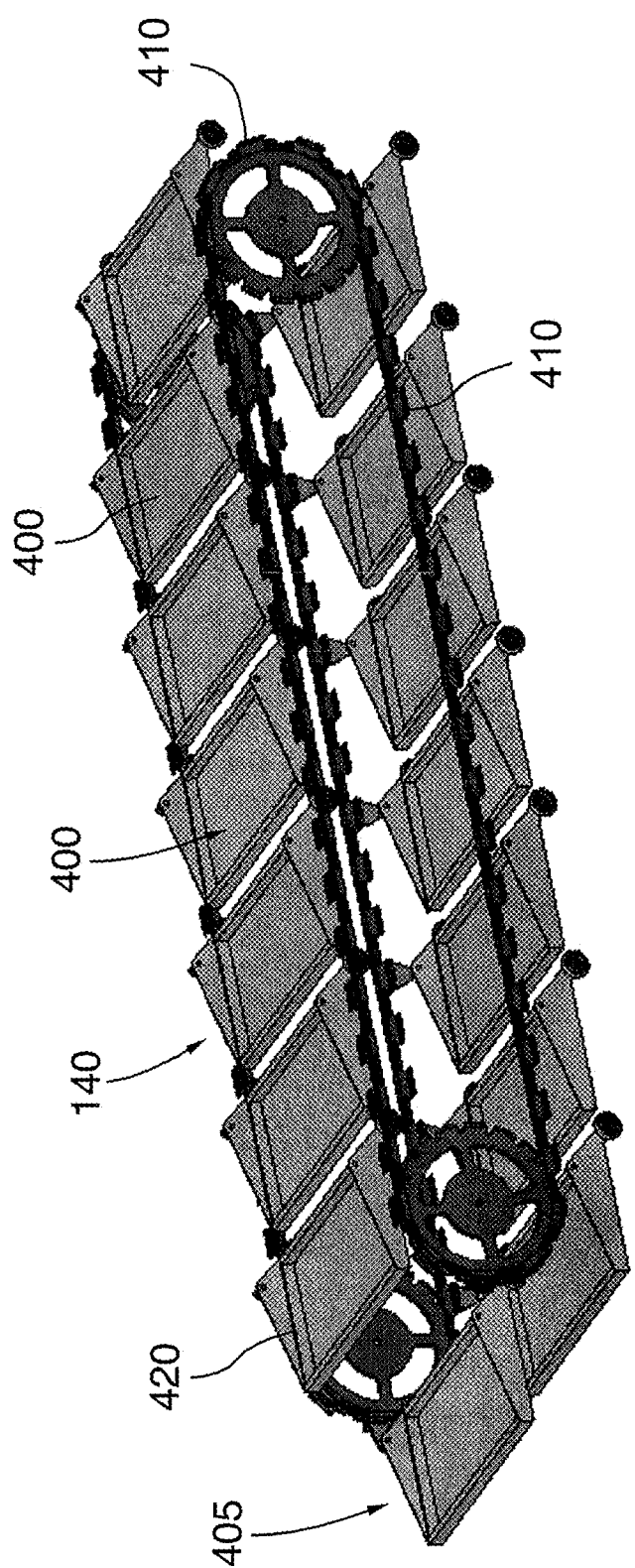
FIG. 2 illustrates an empty seedling handling system according to an embodiment.
Figure 3:
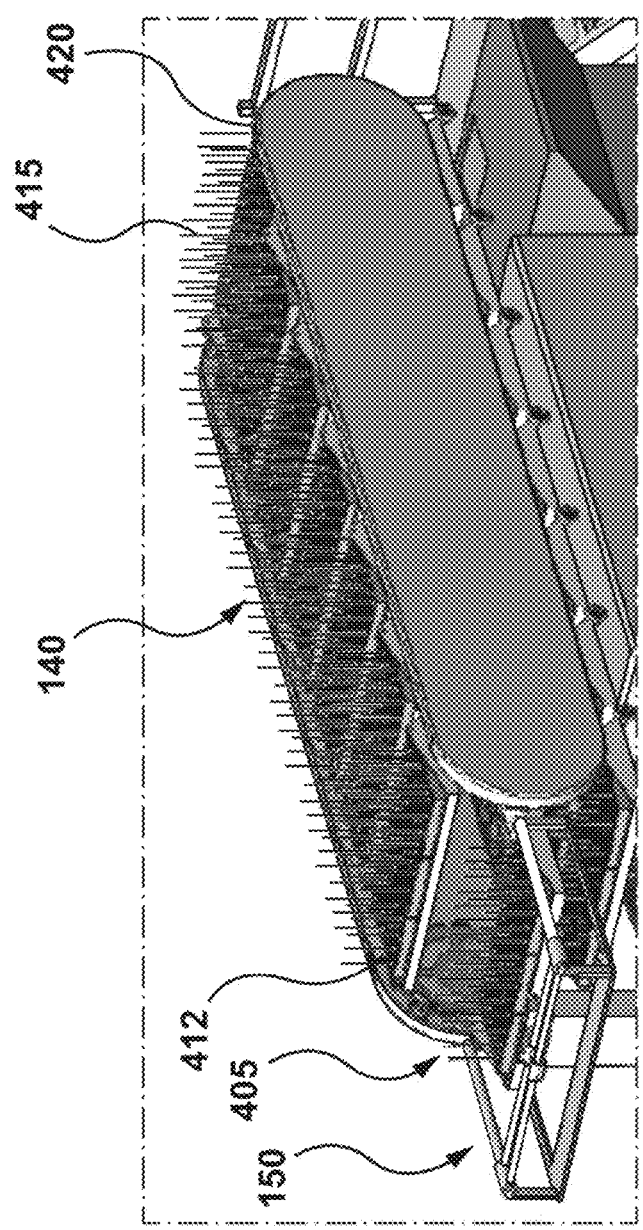
FIG. 3 illustrates a loaded seedling handling system.

FIGS. 2 and 3 are perspective views of the seedling handling system 140 with FIG. 2 showing an empty seedling handling system 140 that is detached from the apparatus 100 and FIG. 3 showing the seedling handling system 140 loaded with seedlings 415. The seedling handling system 140 includes a plurality of chambers 400 for receiving seedling trays 412 that house the seedlings. Each chamber 400 is intended to be sized to fit or receive one tray 412 of seedlings 415 (see FIG. 3). The chambers 400 may be connected and driven by a gear and drive system 410 such that once all the seedlings 415 within a tray 412 have been removed to be transferred or delivered to the seedling chute system 150, the chamber 400 may be rotated away such that a subsequent chamber 400 loaded with at least one tray 412 of seedlings 415 can be rotated to the loading position 405 to be emptied by seedling chute system 150. The retrieval of seedlings 415 may be performed by the seedling chute system at a loading position 405. The gear and drive system (which in one embodiment can be a chain and sprocket drive system) 410 may be covered by an optional cover 420.

In the embodiment shown in FIG. 3, it is intended that the seedling handling system 140 is able to hold or accommodate any number of seedlings in flats or trays 412 without the use of additional trays or the need to separate individual seedlings from the trays 412. In FIG. 3, each chamber 400 is sized to hold six trays of seedlings 415, however, it should be noted that other configurations of seedling handling system 140 are possible and within the scope of the present disclosure.

Figure 4:
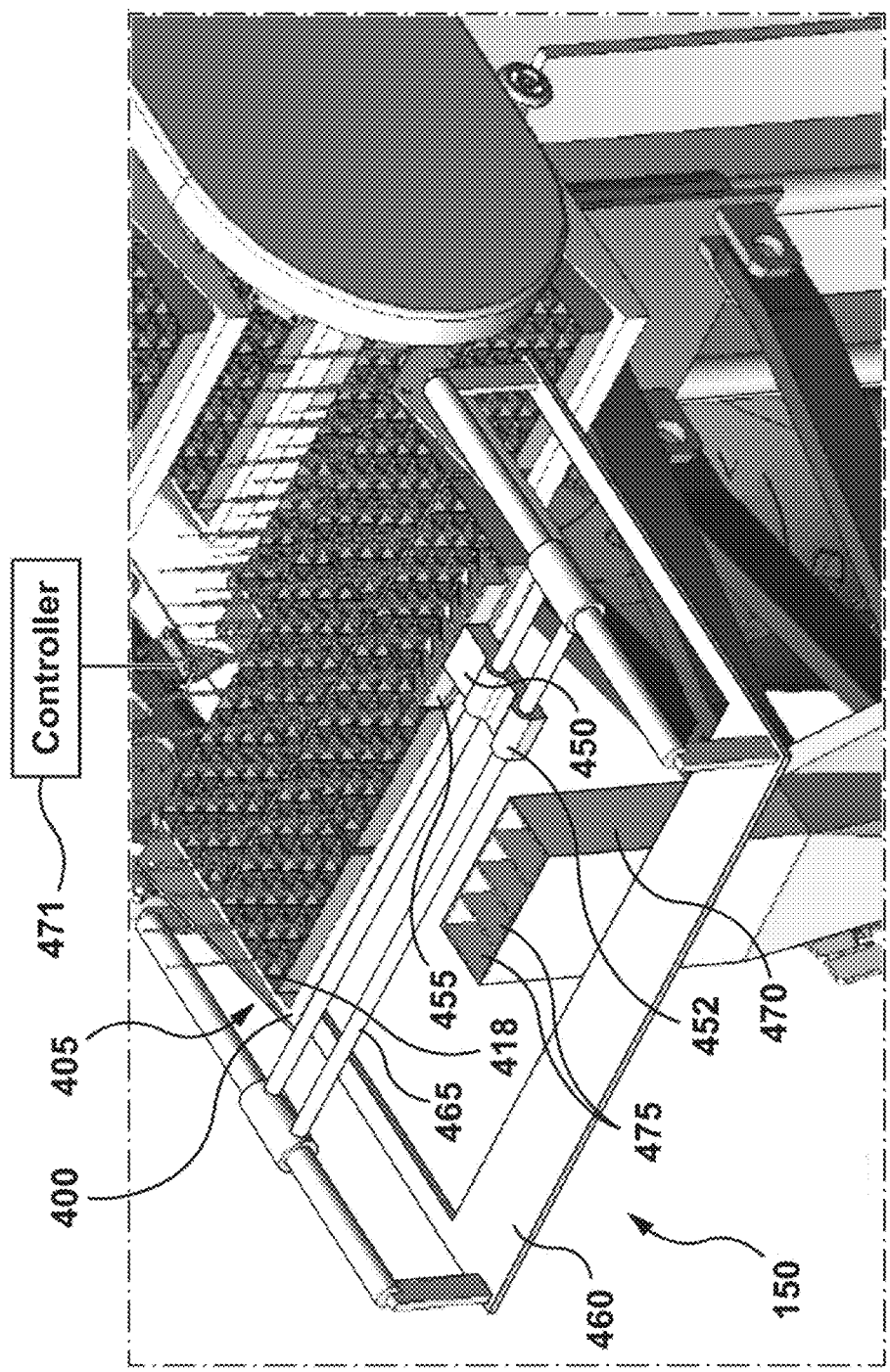
FIG. 4 illustrates a seedling chute system according to an embodiment.

FIG. 4 illustrates one embodiment of seedling chute system 150. As shown, a chamber 400 with seedlings 415 is positioned at the loading position 405. In one embodiment, the chamber 400 is rotated into the loading position by the gear and drive system 410 after the seedling tray in the adjacent chamber has been emptied. The apparatus may include a controller 471, or processor, to control the movement of the gear and drive system 410 or this may be controlled via a set of sensors that sense when a seedling tray is empty. Alternatively, the apparatus may include a controller that is pre-programmed with the characteristics of the seedling trays so that once a chamber of seedlings is emptied, the next chamber is moved to the loading position 405. This may also be performed using a combination of these different controls.

A loader 450 is configured to retrieve a plurality (such as a row) of seedlings 415 from tray 412 when tray 412 is positioned at loading position 405. In some cases, the loader 450 may be configured to retrieve four (4) seedlings 415. In an alternative embodiment, such as disclosed below, the loader 450 may be configured to retrieve seven (7) seedlings at one time. It will be understood that the loader 450 may retrieve more or less seedlings 415 from tray 412 depending on the arrangement of the seedlings 415 in tray 412. In some cases, the loader 450 will include a plurality of sections 455 with each section 455 corresponding to the size of a seedling receptacle 418 within tray 412. Alternatively, the loader may include a plurality of gripping mechanisms with each gripping mechanism corresponding to a seedling receptacle within tray 412.

The loader 450 may be connected to a frame 460 attached to the seedling handling system 140. The frame 460 may include a sliding mechanism 465, or other moveable mechanism that facilitates the loader 450 to retrieve seedlings 415 from tray 412. This may be controlled by the controller 471. The loader 450 includes an arm portion 452 connected to a set of loader sections 455. In the embodiment shown in FIG. 4, loader 450 is shown to slide under and remove seedlings 415 from tray 412 within the chamber 400 of the seedling handling system 140 via the set of loader sections. Upon retrieval of seedlings 415 from tray 412, sliding mechanism 465 may slide the loader 450 towards chute 470 to deposit the seedlings. The sliding mechanism 465 is intended to move laterally and vertically with respect to the frame 460 of the seedling chute system 150 to facilitate retrieval of seedlings 415 by loader 450 and deposit of seedlings 415 by loader 450 into chute 470 for transfer or delivery to planting head 130. In one embodiment, the loader 450 is intended to move longitudinally along sliding mechanism 465 to retrieve consecutive groups of seedlings 415 to load in a chute 470.

The chute 470 may include compartments 475 in a similar sizing, or design, as the loader sections 455 or the design of the seedling tray 412. Each compartment 475 may be configured to receive a single seedling 415 and lowers each seedling to the planting head 130. In an embodiment, each of the compartments 475 can have an independently-controlled valve therein (not shown). In one embodiment, the compartments can be pneumatically controlled. At a correct, or predetermined time, each valve can open independently and allow the seedling in the corresponding compartment 475 to drop via gravity down the chute 470 and into the planting head 130 (e.g. the 3-bladed pocket) for planting. In an alternative embodiment, the seedling can be inserted into the pocket via other pressures or forces, such as, but not limited to water or air. In an alternative embodiment, each compartment may be opened based on signals from a controller. It is intended that by providing a plurality of seedlings 415 to be received by the compartments 475 of chute 470, the frequency with which the planting head 130 has to travel up to receive seedlings may be decreased and the efficiency and productivity of the method and apparatus of the disclosure may be increased.

FIGS. 5A to 8B illustrate the longitudinal movement of the planting head 130 with respect to the seedling handling system 140.

Figure 5A:
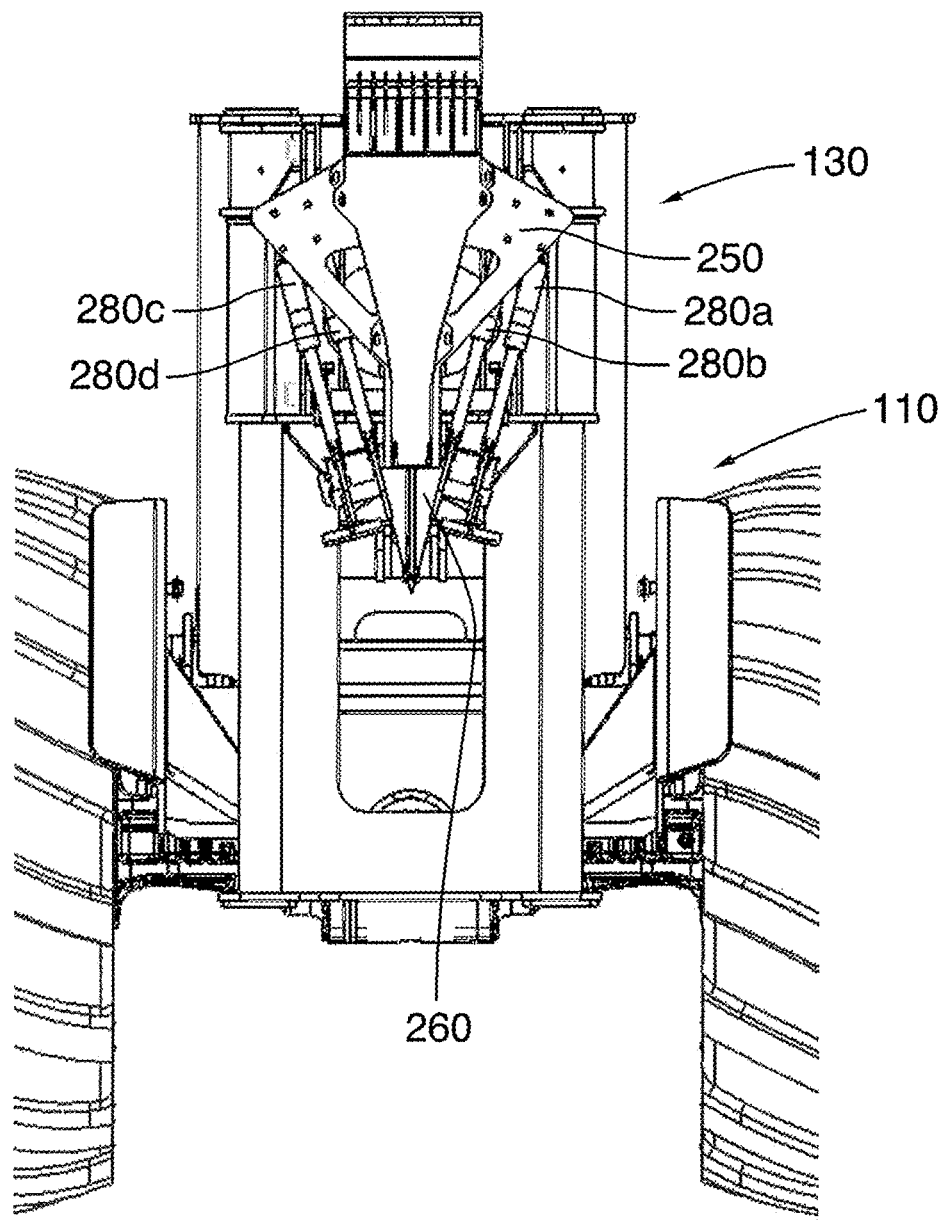
FIGS. 5A and 5B illustrate a front and side view of a planting head in a raised position.
Figure 5B:
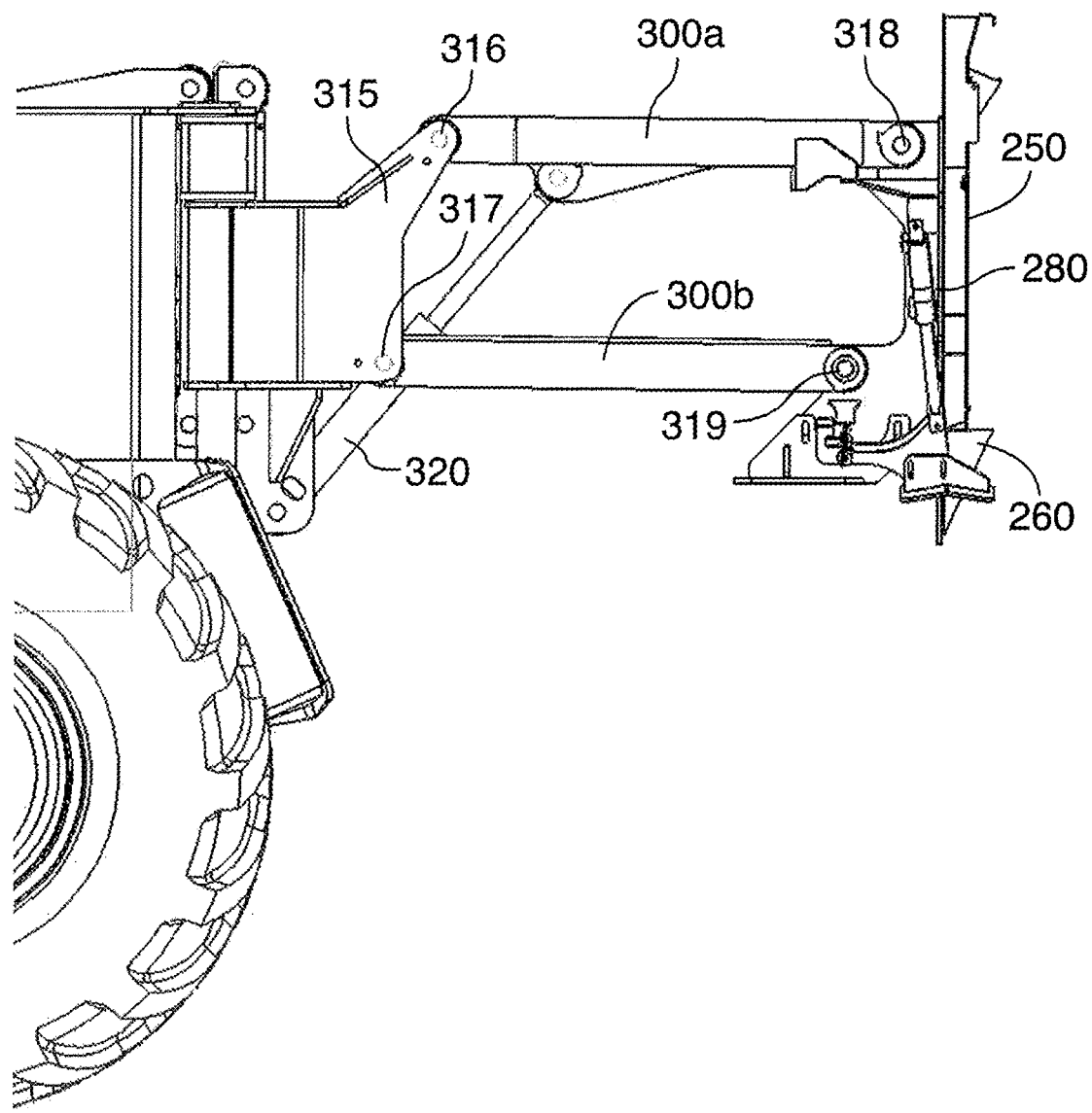

FIG. 5A illustrates a front view of the planting head 130 at a raised position. The planting head 130 is configured to receive seedlings 415 from seedling chute system 150 and plant seedlings 415 into the ground.

To plant seedlings 415 into the ground, the planting head 130 is configured to slide longitudinally and translate laterally (relative to the tractor 110) as the tractor moves. Planting head 130 is configured to travel between the raised position (FIGS. 5A and 5B) and a lowered position (FIGS. 7A and 7B), the raised position for receiving seedlings 415 from the seedling chute system 150 and the lowered position for planting the seedlings 415 into the ground.

As shown in FIGS. 5A to 8B, a body 250 of the planting head 130 is coupled to at least one sliding component such that the planting head can move between the raised and lowered positions. The body 250 provides stability to planting head 130. Since the height of the planting head 130 should preferably remain below the seedling handling system 140 (e.g. to receive seedlings via gravity), at least one vertical cylinder or pump may extend above seedling handling system 140. In the embodiment of FIG. 5A, two cylinders 550 (as shown in FIG. 8A (where one is in front of the other) are used, and connected in parallel. A first cylinder is connected from the base to the sliding component 310, and the second is connected from the sliding component 310 to a planting head sliding mount. This provides that the cylinders are overlapped but utilizes their full stroke length.

In the embodiment described herein, two supports 300a and 300b are provided that operate simultaneously although other arrangements involving more or less supports may be possible and their operation may be staggered in time. Although hidden in FIG. 5a, it will be understood that there are corresponding supports behind supports 300a and 300b. The supports 300a and 300b facilitate movement of the planting head 130 between the raised position (see FIGS. 5A and 5B) and the lowered position (see FIGS. 7A and 7B), through a partially-raised position (see FIGS. 6A and 6B), where in the raised position the body 250 of planting head 130 is spaced a greater distance from the ground than when the planting head 130 is in the partially-raised position. In the partially-raised position, the body 250 of planting head 130 is spaced a greater distance from the ground than when the planting head 130 is in the lowered position.

In the embodiments shown in FIGS. 5A to 8B, the supports 300a and 300b rotatably couple to at least one longitudinal shaft 310 of the planting head 130 via a mounting portion 315 at couple points 316 and 317. In one embodiment, the couple points 316 and 317 are spherical bushings. Couple 315 provides that, upon actuation of cylinder 320, body 250 of planting head 130 can travel between the raised position and the partially-raised position by rotation of supports 300a and 300b about couple, of pivot points 316 and 317, respectively about horizontal (or substantially horizontal) axes transverse and spaced from shaft 500. In the current embodiment, the supports 300a and 300b can be seen as parallel arms. Coupling apparatus 315 slidingly couples to shaft 500 to provide for sliding movement of the coupling apparatus 315 in a transverse direction relative to the axes of rotation of supports 300a and 300b to provide for movement of the planting head 130 in a vertical direction between the partially-raised position (see FIGS. 6A and 6B) and the lowered position (see FIGS. 7A and 7B).

Body 250 of planting head 130 rotatably couples to supports 300a and 300b at couple, or pivot points, 318 and 319. As previously described, upon actuation of cylinder 320, body 250 of planting head 130 travels between the raised position, the partially-raised position and the lowered position as supports 300a and 300b rotate about couple, or pivot, points 316 and 317, respectively. To maintain body 250 in a vertical orientation with respect to the ground (e.g. to maintain a face of body 250 to be substantially perpendicular to the ground), body 250 rotates about a horizontal axis transverse and spaced from shaft 500 at couple points 318 and 319 while planting head 130 travels between the raised position and the partially-raised position (e.g. while supports 300a and 300b rotate about couple points 316 and 317, respectively).

Figure 6A:
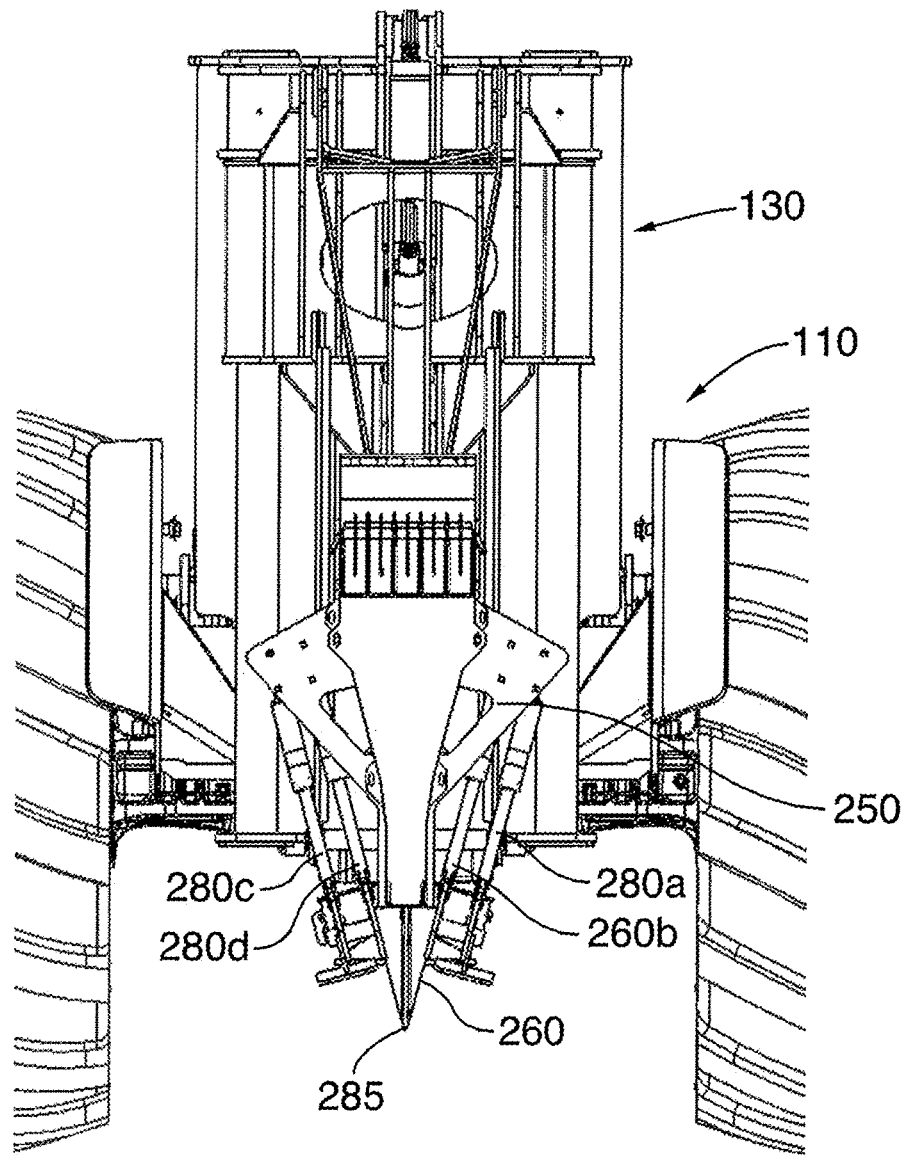
FIGS. 6A and 6B illustrate a front and side view of a planting head in a partially lowered position.
Figure 6B:
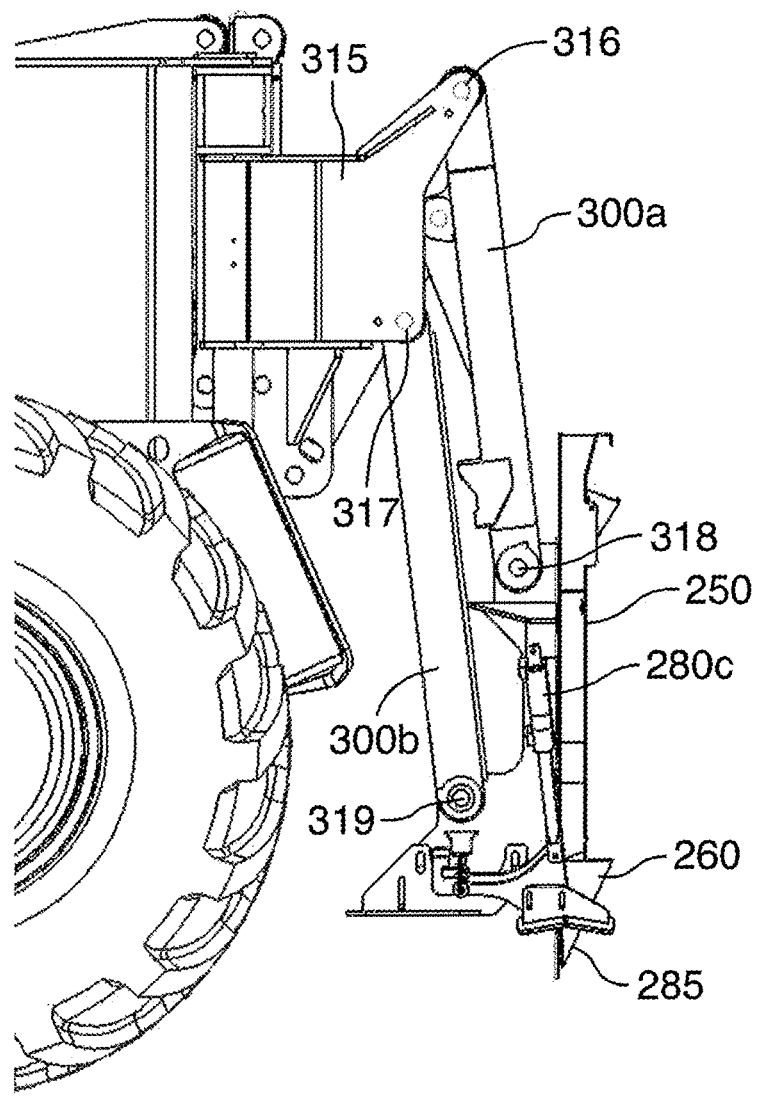

FIGS. 6A and 6B illustrate a front view and a side view, respectively, of the planting head 130 at the partially-raised position. In the current figures, supports 300a and 300b rotate, such as in a clockwise direction, about couple points 316 and 317, respectively to lower body 250 to be proximate to the ground relative to the raised position. Additionally, body 250 has rotated about couple points 318 and 319 in a clockwise direction to maintain a vertical orientation of the face of body 250 relative to the ground. The partially-raised position provides that the body 250 is proximate to the ground to prepare for planting seedlings 415, but protects against the body 250 striking the ground and thereby damaging seedling 415.

Figure 7A:
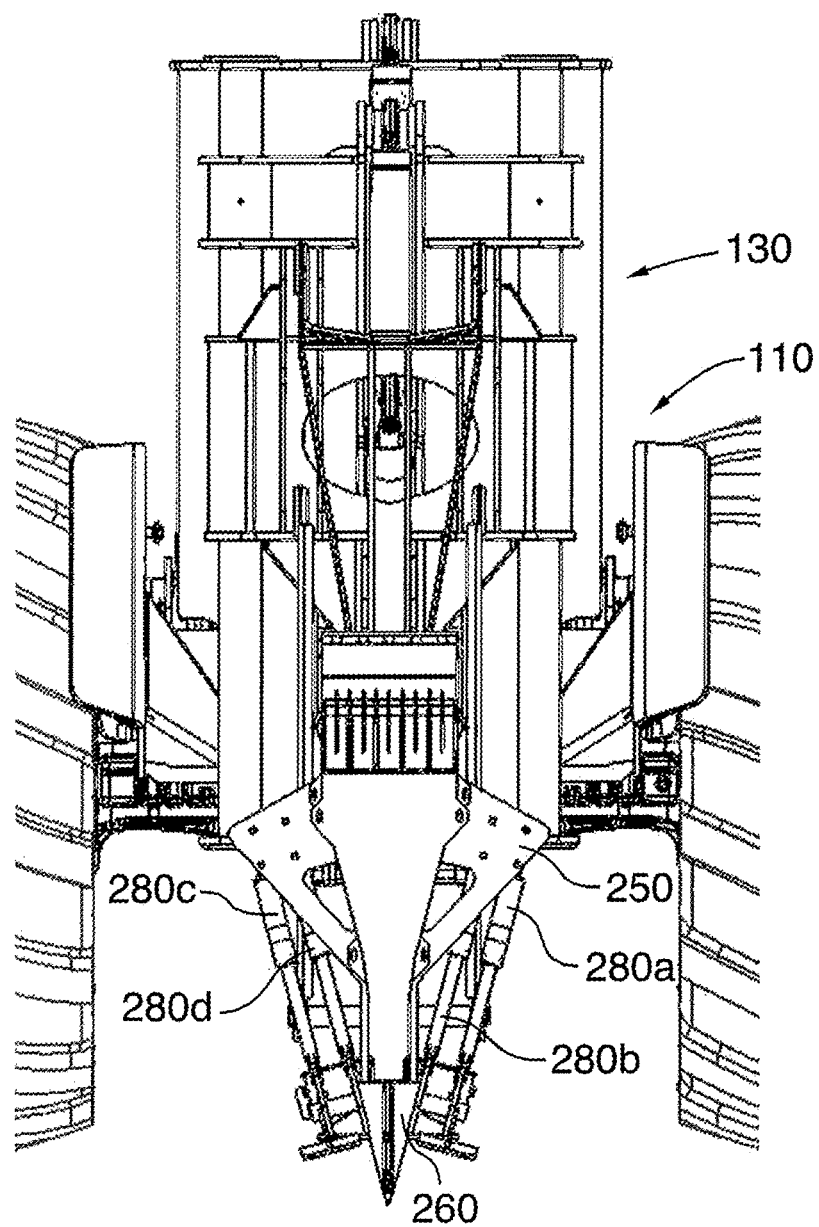
FIGS. 7A and 7B illustrate a front and side view of a planting head in a lowered position.
Figure 7B:
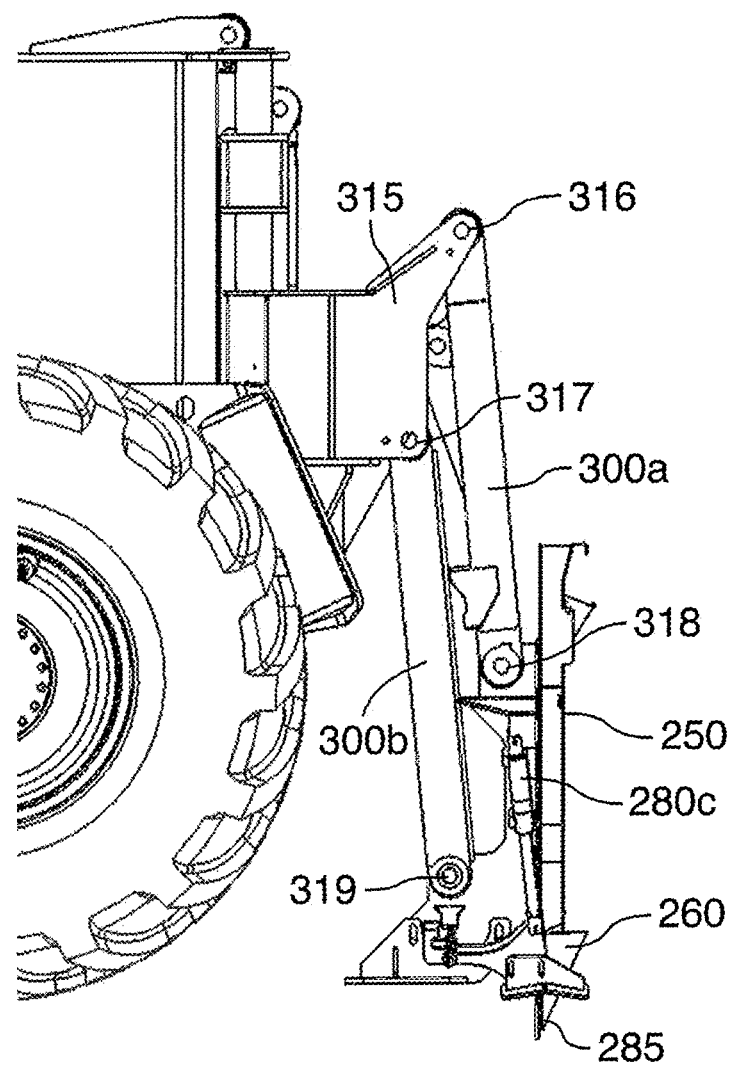

FIGS. 7A and 7B show a front view and a side view, respectively, of the planting head 130 at the lowered position. After movement of planting head 130 to the partially-raised position, to plant a seedling 415, the body 250 is lowered into the ground by sliding the coupling apparatus 315 vertically towards the ground along shaft 310 until a tip 285 of body 250 creates a hole in the ground.

Figure 8A:
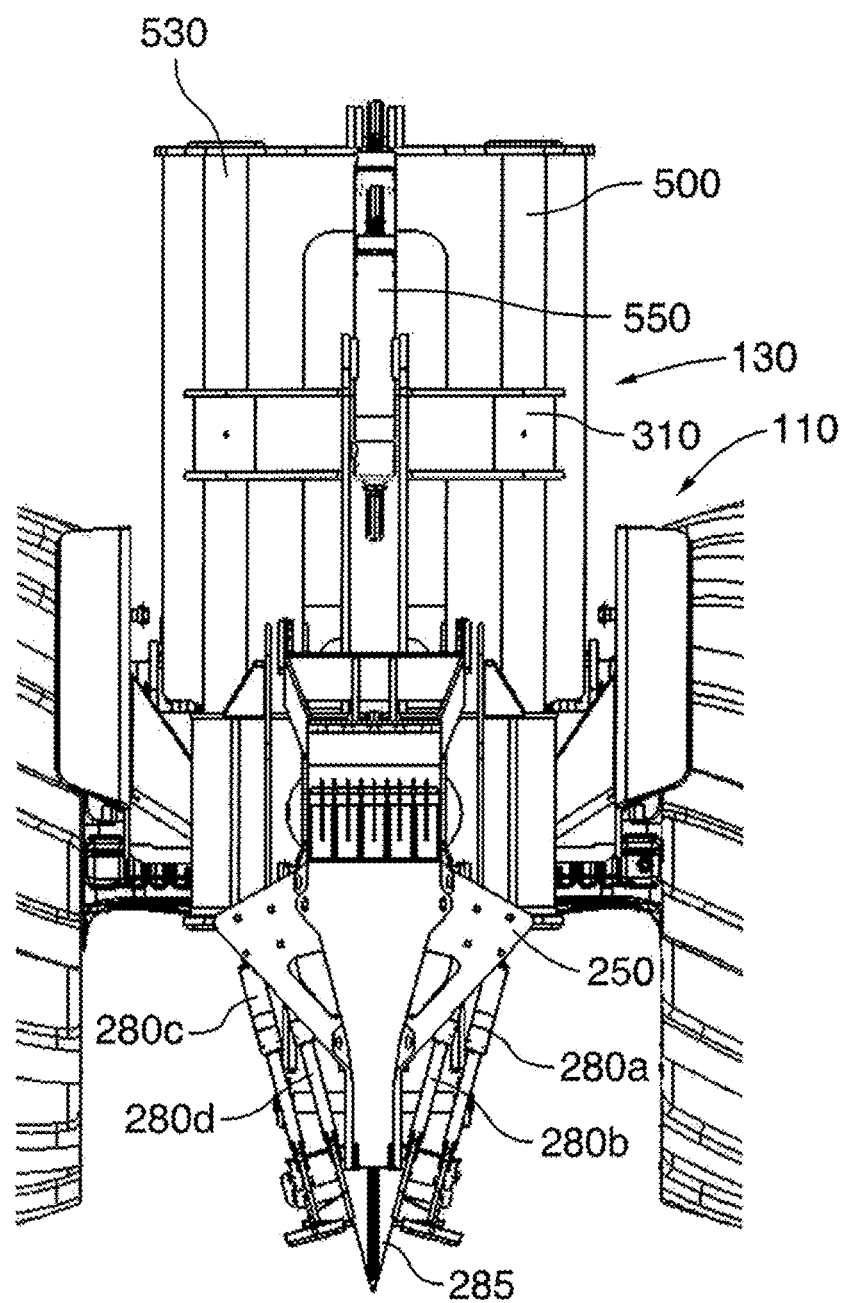
FIGS. 8A and 8B illustrate a front and side view of a planting head in a lowered and extended position.
Figure 8B:
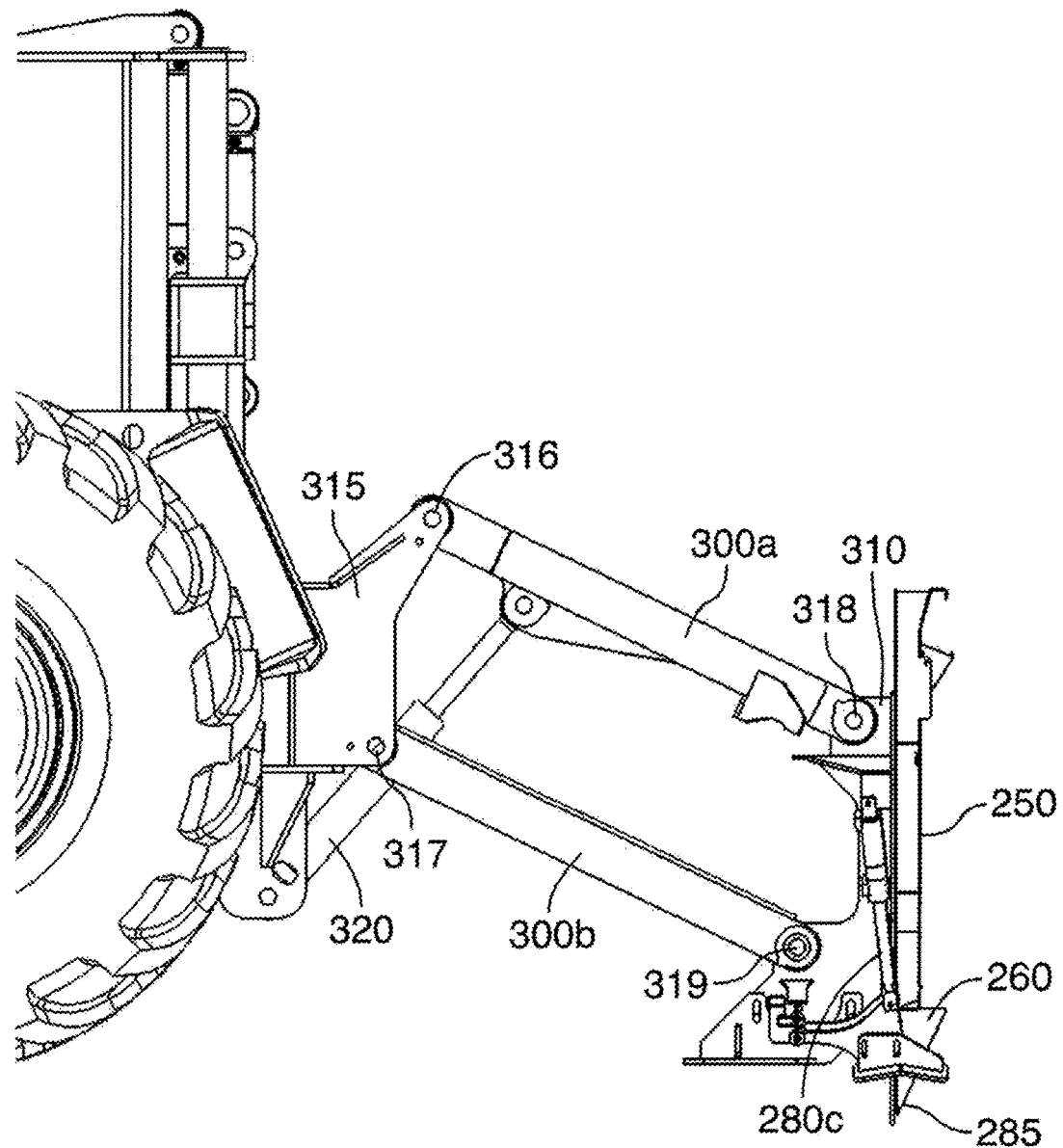

FIGS. 8A and 8B illustrate a front and side view, respectively, of the planting head 130 at a lowered and extended position. After tip 285 of body 250 creates a hole in the ground for planting a seedling, to provide for continuous movement of the tractor 110 during planting, couple 315 continues to slide vertically towards the ground along shaft 310. As the coupling apparatus 315 slides vertically towards the ground, supports 300a and 300b begin to rotate about couple points 316 and 317 in a counter-clockwise direction such that supports 300a and 300b approach a horizontal orientation with respect to the ground. Rotation of supports 300a and 300b counter-clockwise towards a horizontal orientation with respect to the ground provides that the body 250 may maintain its position in the hole created by tip 285 as the tractor 110 continues its movement away from the hole to provide the seedling 415 to rest within the hole.

It should be noted that as the planting head 130 travels between the position shown in FIGS. 7A and 7B and the position shown in FIGS. 8A and 8B, the coupling apparatus 315 vertically slides to the ground under the force of gravity in what may be considered a hydraulic float state as both ends of the cylinder are vented to allow it to float freely. Also, the supports 300a and 300b are rotating due to the force applied by the coupling apparatus 315 as the coupling apparatus 315 drops. Pressure may be relieved on the "rod end" of cylinder 320 using a hydraulic pressure relieving valve (not shown) to provide for the body 250 of the planning head 130 to essentially "rest" in the planting position without excessive lateral forces acting in the same axis as the length of the apparatus 100 that would tend to push it out of its positon fore and aft with respect to the direction of travel of the apparatus 100. Alternatively, the pressure in the cylinder(s) 550 are controlled to control the downward force of the planting head such that the planting head is inserted or urged into the ground under a specific pressure. Holding that pressure in the cylinder or cylinders 550 allows for elevation changes in the tractor or apparatus to be experienced without affecting the planting of the seedling or changing the position of the planting head.

In one embodiment, the flexibility or tilting of the body 250 of the planting head 130 to allow for side-to-side motion is preferably implemented using spherical bearings in, for example, 8 locations connecting supports 300a and 300b with the coupling apparatus 315 and body 250 (and the supports hidden behind 300a and 300b). In one embodiment, there is a tie-shaft to connect the two 300b arms to the pivot location 319 that permits full articulation of the planting head 250. This system allows the lower tip of the planting head 250 to move side-to-side if an external force is exerted on it in this direction, again, allowing it to "rest" in its position in the ground during planting.

It is intended that the planting head 130 is adapted to quickly release each seedling 415 to provide for continuous planting while the tractor 110 remains in motion. FIGS. 9A to 11B show the movement of planting head 130 from a closed position to an open position (through a semi-open position) to provide for the release and planting of seedlings 415 when the planting head is in the lowered position.

Figure 9A:
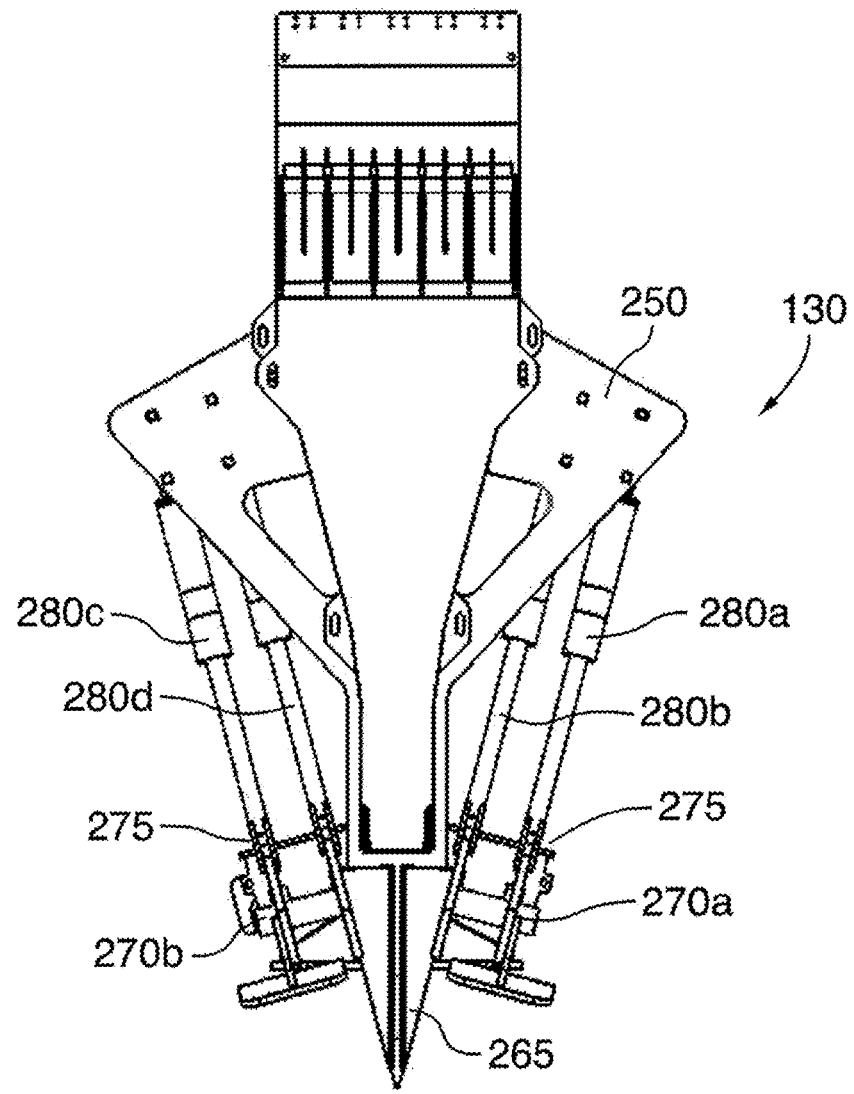
FIGS. 9A and 9B illustrate a front and side view of a planting head in a lowered and closed position.
Figure 9B:
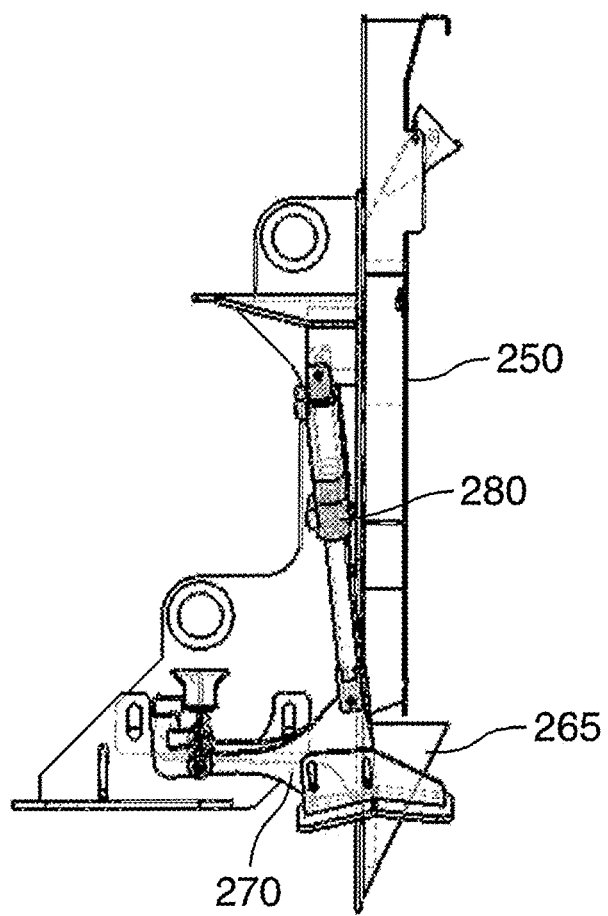

FIGS. 9A and 9B illustrate front and side views of the planting head 130 in a closed position (e.g. a position when the planting head is configured to receive a seedling 415 (not shown) from the seedling chute system 150). In the closed position, planting head 130 includes a bladed pocket 260 which is raised and lowered in relation to the ground. In the current embodiment, the bladed pocket 260 is formed by a plurality of retractable blades 265 and the body 250, where retractable blades 265 and body 250 co-operate to form a substantially continuous perimeter configured to hold a seedling 415. In the current embodiment, the bladed pocket 260 is triangular in shape, however, other shapes are contemplated. Bladed pocket 260 is configured to hold a seedling 415 when the planting head 130 is in the closed position. In the embodiment shown, retractable blades 265 are shaped such that a seedling can be inserted into a top portion of pocket 260 but is closed such that the seedling does not fall through a bottom portion of pocket 260, thereby providing for pocket 260 to support a seedling 415 above the ground. Retractable blades 265 are configured to retract relative to each other (e.g. in a direction away from each other) to disrupt the continuous perimeter of pocket 260. Upon retraction of blades 265 with respect to each other and the disruption of the perimeter of pocket 260, a seedling 415 supported by the co-operation of blades 265 and body 250 will fall or be urged to pass through the bottom portion of pocket 260 (e.g. the blades 265 will release the seedling 415 from pocket 260). This will be described in more detail below.

In the embodiments shown herein, two retractable blades 265 are shown which are operated simultaneously, however other arrangements involving more blades may be possible and their operation may be slightly staggered in time. The two retracting blades lift up and out of the way so that the planting head 130 only has to lift out of the ground slightly before it can move forward with the tractor. The design and/or motion of the retractable blades is designed or selected such that the retracting blades do not collide and push the freshly planted seedling over by its stem as the tractor advances forward.

The planting head 130 also includes at least one tamper portion 270. In the embodiment shown herein, two tamper portions 270*a* and 270*b* are shown although other configurations with more or less tamper portions are possible. Retractable blades 265 and tamper portions 270*a* and 270*b* may be moveable or controlled via pneumatic or hydraulic pumps 280*a* to 280*d*. In the embodiments shown, pumps 280*b* and 280*d* can retract the retractable blades 265 while pumps 280*a* and 280*c* can move tamper portions 270*a* and 270*b*, respectively. In some cases, gravity may be used to provide for the dropping of the planting head 130 and friction may be used to hold the planting head 130.

Figure 10A:
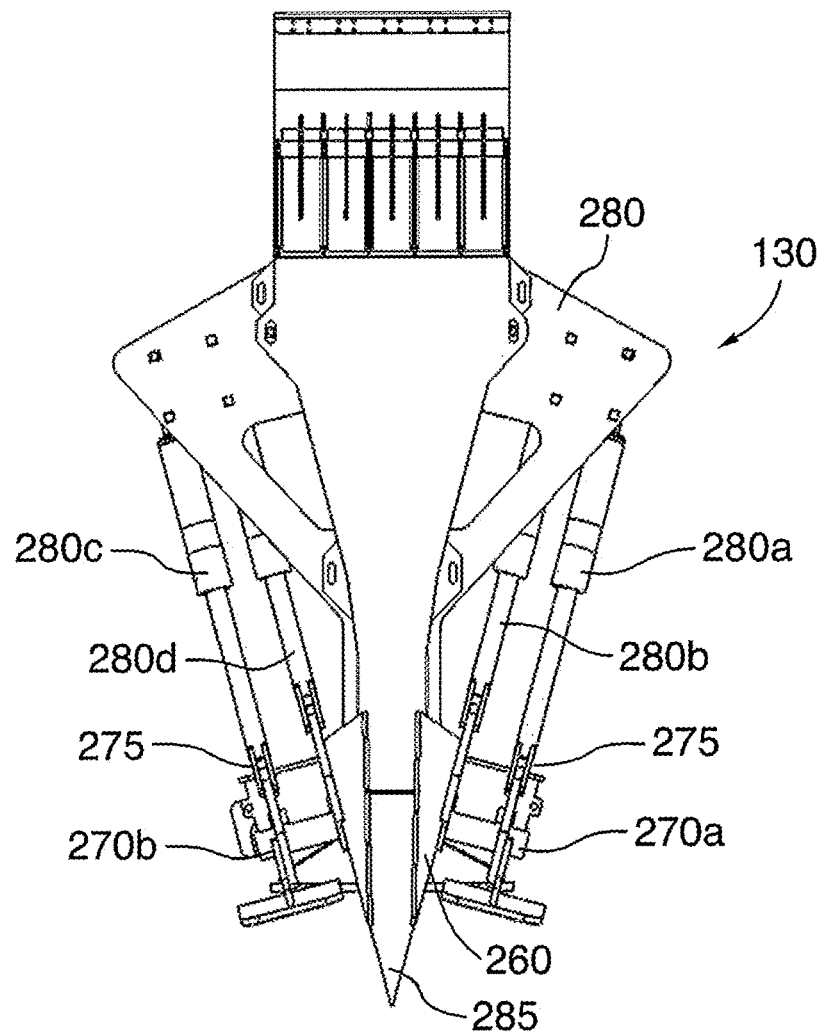
FIGS. 10A and 10B illustrate a front and side view of the planting head of FIGS. 9A and 9B in a lowered and semi-open position.
Figure 10B:
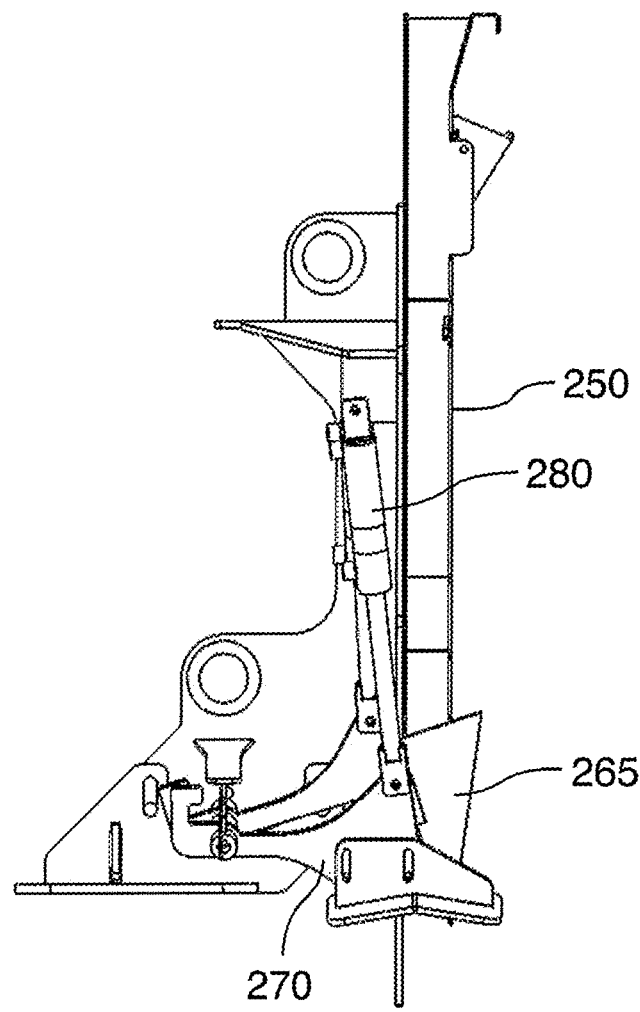

FIGS. 10A and 10B illustrate the planting head 130 in a semi-open position. Herein, pumps 280*b* and 280*d* have actuated to partially retract blades 265 with respect to each other showing the tip 285 of the planting head 130. It is intended that the tip 285 be sufficiently pointed and rigid to provide support and an indentation in the ground for the seedling during the planting process. The seedling 415 (not shown) is intended to be released from pocket 260 adjacent to the tip 285 in the indentation or hole provided by the vertical movement of the planting head 130 into the ground. Tamper portions 270*a* and 270*b* are intended to aid in planting seedlings 415 by reducing the amount of soil that might fall back into the hole and potential injure or damage the seedling 415. Tamper portions 270*a* and 270*b* may also have shoes attached (not shown) to indicate the proper depth of the planting tip 285 in the ground by lifting slightly from the lowered position due to the upward acting force of the soil. Once the retractable blades 265 have retracted and the seedling has fallen into the formed hole, the tamping portions 270*a* and 270*b* can compress the soil on an angle toward the root plug of the seedling to cover the root plug with soil for the completion of a successful seedling planting operation. If roots are exposed to air they will die, so the soil is preferably compressed against the roots to improve the chance of or ensure the survival and health of the seedling.

Figure 11A:
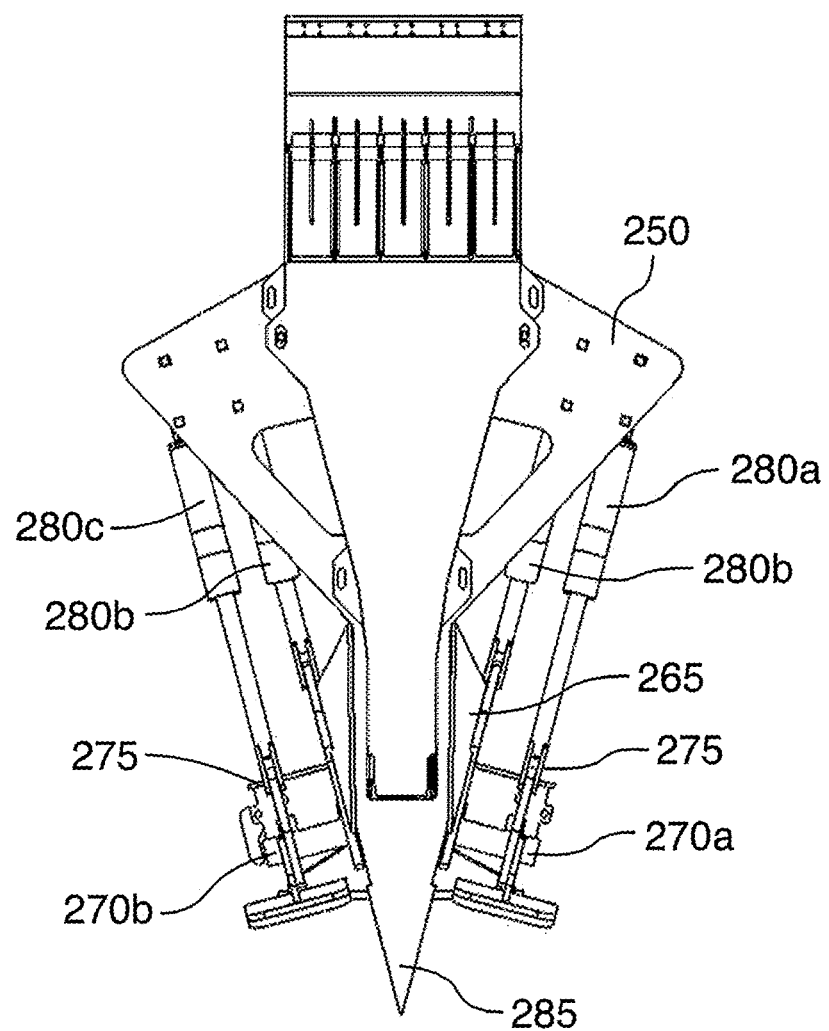
FIGS. 11A and 11B illustrate a front and side view of the planting head of FIGS. 9A and 9B in a lowered and open position.
Figure 11B:
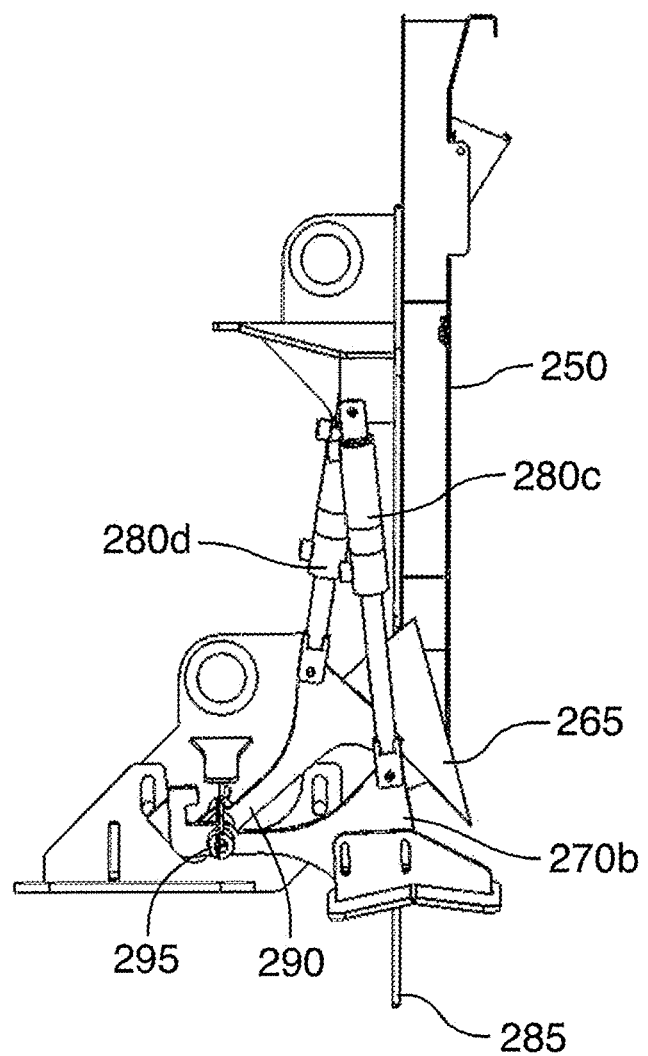

FIGS. 11A and 11B illustrate the planting head 130 in a fully retracted position. As previously described, as the pumps 280*b* and 280*d* actuate, the retractable blades 265 retract with respect to each other (e.g. in a direction away from each other) to provide for release of seedling 415 from pocket 260. Actuation of pumps 280*b* and 280*d* also provides for blades 265 to tilt upwards in a direction opposed to the ground. As shown in FIG. 11B, retractable blades 265 are coupled to pump 280 via a coupling 290. As shown as an example, actuation of pump 280*d* provides for rotation of coupling 290 about couple point 295. Retractable blade 265 thereby is lifted away from the ground while tamper portion 270 maintains contact with the ground.

In some cases, spherical bearings or bushings may be used which is/are intended to allow for some undesired movement in the rotation and/or translation of the planting head without affecting the planting process. Allowing for the reaction to undesired rotation and/or translation is intended to provide the ability to deal with bumps or rocks in the soil as the tractor moves forward.

One embodiment of the planting process will now be described. The embodiment is disclosed with the assumption that the planting head is in the lowered position with seedlings already transferred into the seedling chute system and the pocket 260 empty.

As the tractor moves forward, the tip 285 prepares a hole for the seedling to be planted and the tamper portions stir the loose ground around the hole. A set of sensors, not shown, transmit signals to the controller representing the position of the tamper portions. In one embodiment, as the hole is being prepared, a seedling is transferred into the pocket via the seedling chute system. In another embodiment, the seedling is transferred once the blades are closed to form a pocket. Sensors are preferably located proximate the retractable blades to determine when the blades are closed (thereby forming the pocket) and when the blades are retracted (thereby not forming the pocket). In a preferred embodiment, the seedling is released into the pocket only when the sensors sense that the pocket is formed. The bottom of the pocket is in the hole that is prepared by the tip 285. This is the position schematically shown in FIGS. 9A and 9B.

In another embodiment, the controller may control the seedling chute system to release a seedling when the tamper portions are in a predetermined position, such as a tamping position whereby the tamper portions are either stirring the loose ground or tamping the soil, or both, and when the pocket has been formed.

As the truck continues to move forward, once the tamper portions have reached a second pre-determined position or based on a time period that has elapsed, the controller transmits a signal to the planting head to move into the planting position, such as schematically shown in FIGS. 10A and 10B. As the retractable blades of the planting head open, or retract, to allow the seedling to drop into the hole created by the tip 285, the tamper portions 270 move away from the seedling so as not to interfere with the planting of the seedling. In the preferred embodiment, the tamper portions are retracted along an axis by the pumps.

As discussed above, in order to plant the seedlings, the retractable blades open away from each other allowing the seedling to slide into the hole. In a preferred embodiment, the design of the retractable blades provides a guiding system to direct the seedling into the desired position. After the seedling is planted into the hole, the seedling preferably passes through an opening between the retracted blades as the tractor continues moving forward so that contact between the blades and the planted seedling is less likely or avoided.

As the tractor moves forward, the blades 265 are then pulled away from the ground in order to receive the next seedling. As the blades move away from the ground, the tamper portions are then urged back towards the ground (as schematically shown in FIGS. 11A and 11B). While the retractable blades are retracting, the tamper portions move towards the tamping position to tamp the soil around the root plug. As the retractable blades are being retracted, they are also closed in order to create the blade pocket to receive the next seedling.

After, or while, being retracted, the blades are closed and the pocket returns to the position of FIGS. 9A and 9B whereby a new seedling can then be transferred (such as by gravity) into the closed pocket. The process is then repeated for each of the seedlings transferred from the chute system.

After all the seedlings from the chute system have been planted, the seedling chute system and the planting head are urged by the supports 300*a* and 300*b* back to the seedling handling system in order to receive a next set of seedlings from the loader. Since the tractor continues to move as the seedlings are being planted, it is desired that the system is set up such that the motion of the seedling chute system and planting head is pre-programmed to obtain seedlings from the chute seedling system after the row of seedlings are planted and the timing of the apparatus designed to provide continuous planting. In one embodiment, this is controlled by the controller.

For instance, if the seedling tray contained rows of seven seedlings, the motion of the planting head after the first six seedlings are planted is to return to obtain another one from the chute seedling system, however, after the seventh seedling is planted, the chute seedling system and the planting head move from the lower position to the raised position to receive another set (or row) of seedlings from the seedling handling system. The motion of the planting head is preferably pre-programmed and based on an understanding of the capacity of the seedling tray.

In a preferred embodiment, use of spherical bushings provide multi-degrees of motion to the supports and planting head. Use of the spherical bushings allow the planting apparatus to compensate when the tractor is passing over uneven ground. In other words, the couple points, or the linkages are flexible. The spherical bushings allow the tractor to continue to move over the land, even if uneven, without affecting the planting of the seedlings. As such, the seedlings remain in a planted position with their root in the ground even if the tractor is going over bumpy ground. The spherical bushings allow the frame to sway, move or swing with respect to the uneven ground.

Figure 12:
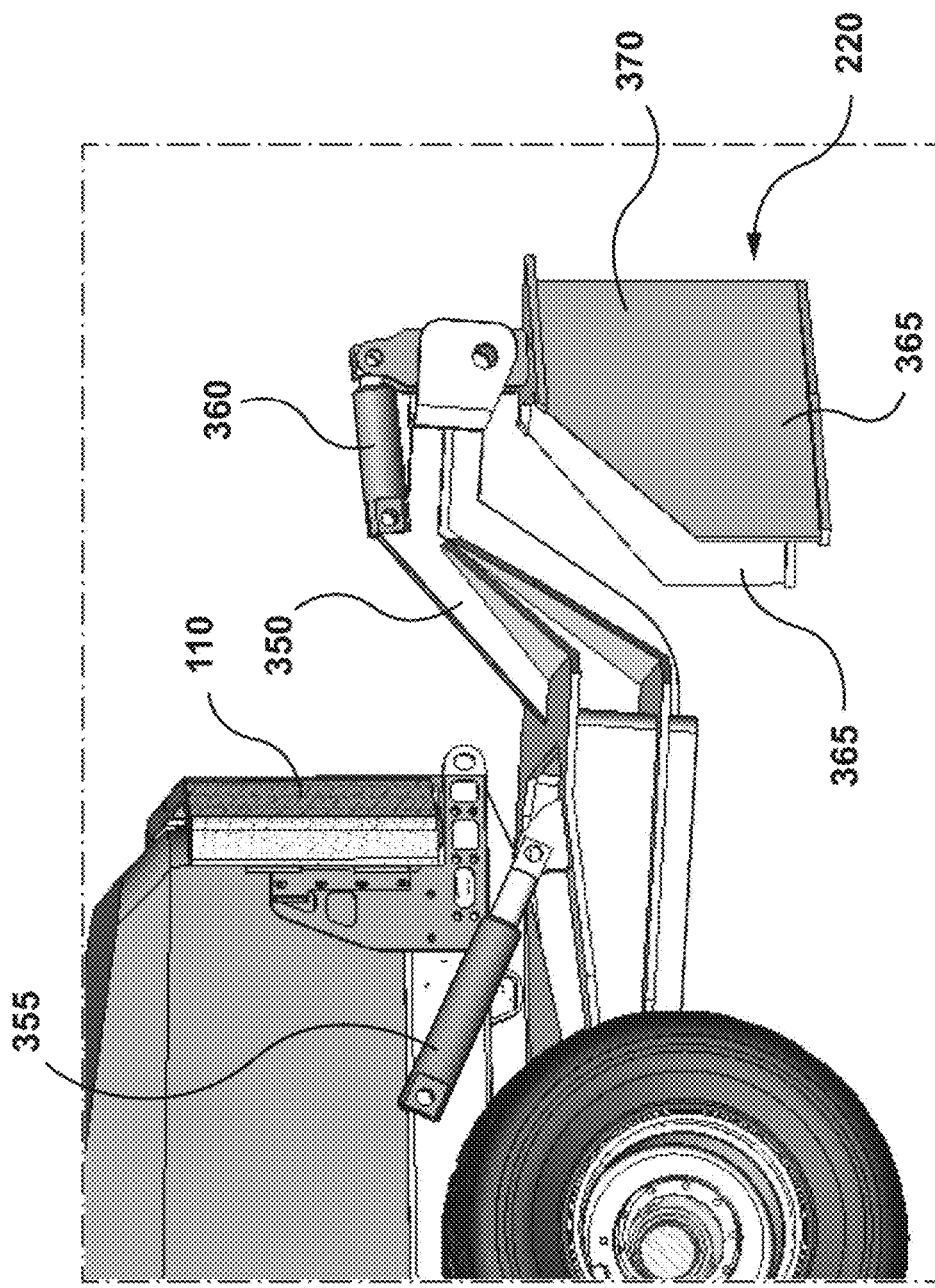
FIG. 12 illustrates a surface clearing blade according to an embodiment.

FIG. 12 illustrates the surface clearing blade 220 in further detail. The clearing blade 220 may connected to the tractor 110 via a support structure 350. The support structure may include hydraulic or pneumatic attachments 360 that provide for the clearing blade 220 to maneuver in rocky or bumpy terrain and remove debris, for example, twigs, rocks and the like, from the path where the seedlings are intended to be planted. In a preferred embodiment, the clearing blade 220 has a flat or v-shaped front with angular sides 365. The clearing blade 220 may include protrusions 370 along the bottom of the front and sides. It should be noted that the blade 220 may retract automatically if it collides with an obstruction like a tree stump or larger rock. In another embodiment, the surface clearing blade 220 may include a rotary drum to further assist in moving the debris away from the path of the tractor.

Figure 13:
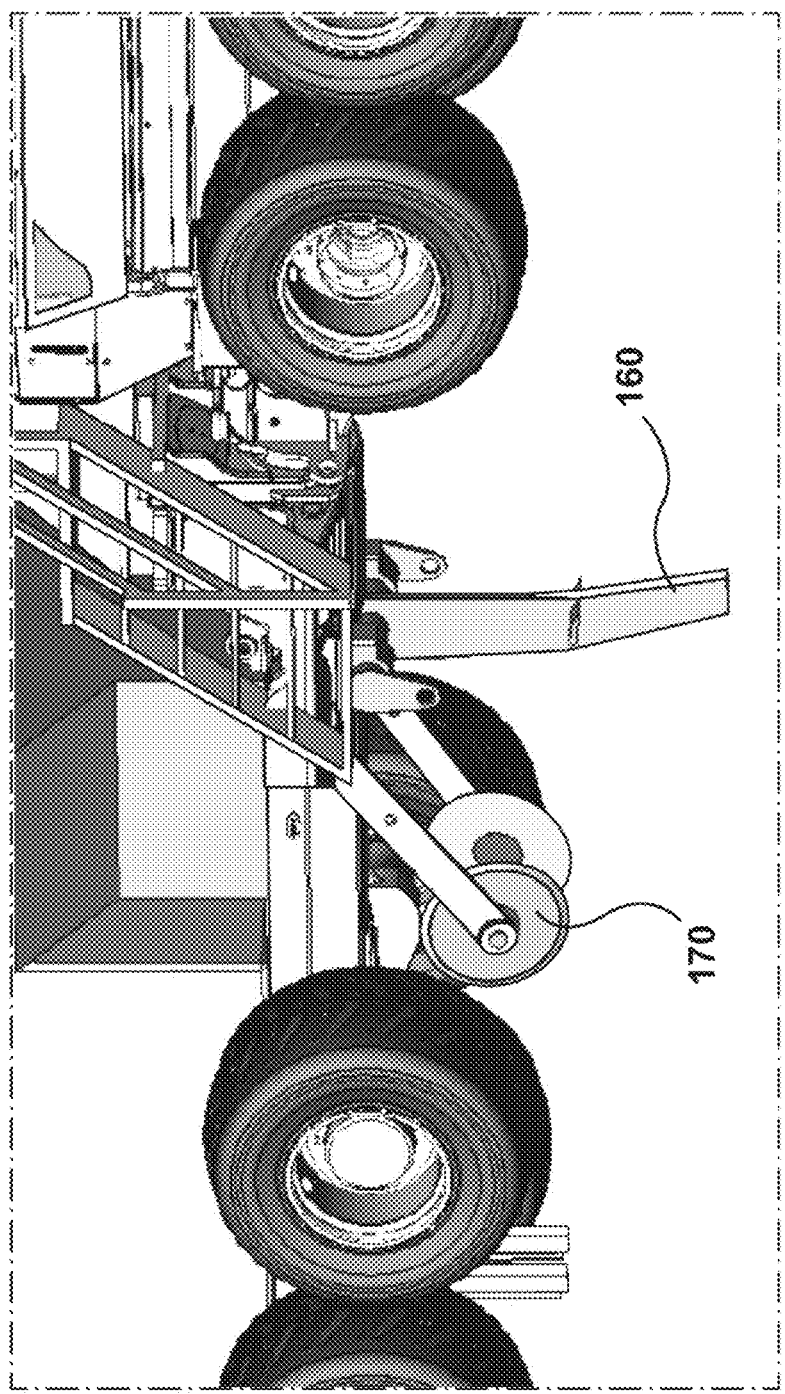
FIG. 13 illustrates a ripping blade and soil fracturing discs according to an embodiment.

FIG. 13 illustrates the ripping blade 160 and soil fracturing discs 170. The ripping blade 160 is intended to protrude into the surface of the earth to create a trench that will be aligned with the planting head 130. It should be noted that the seedling doesn't drop into this trench as the soil fracturing discs 170 close the top of the ripped trench prior to the planting of the seedling. The trench is created to loosen the hard-packed soil beneath the loosened top soil layer of the field. This assists to promote healthy root growth by making it easier for roots to grow deeper as well as allowing water/nutrients to trickle down to the depth of the ripped trench and keep the tree hydrated in dry environments. As outlined above, the planting head 130 (via the tip 285) creates the hole in which to plant the seedling. The blades and/or discs may also inject fertilizer into the hole where the seedling is planted.

In one embodiment, the soil fracturing discs 170 are intended to close the top portion of the ripped trench and further cultivate the soil in order to prepare the area for receiving the seedling. The combination of the ripping blade 160 and soil fracturing discs 170 are intended to provide a tilling component to the planting apparatus 100, which is intended to address the compacted, weedy or rocky nature of the soil. Although two soil fracturing discs 170 are shown, it will be understood that any number of discs may be used depending on the conditions of the soil and spacing between the discs.

Figure 14:
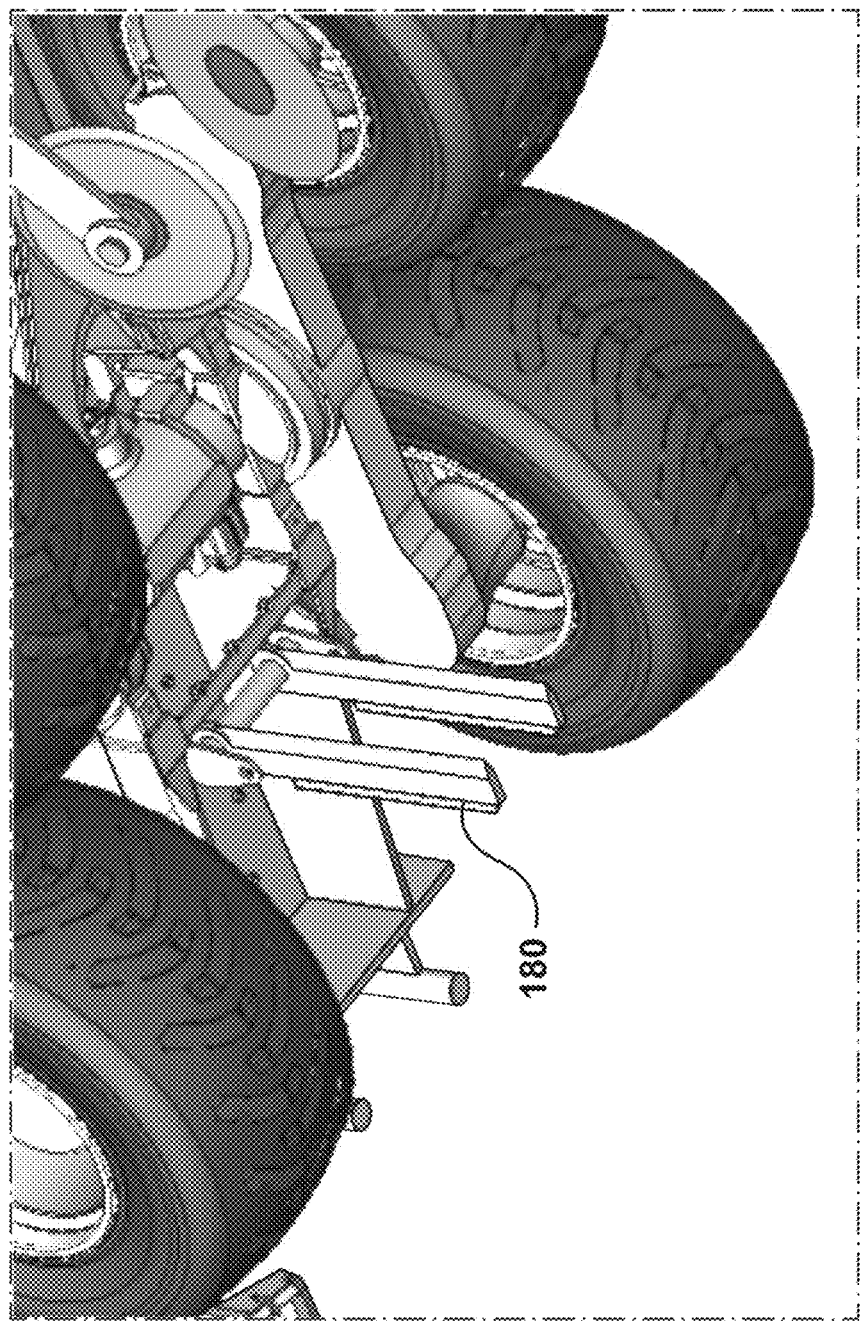
FIG. 14 illustrates fertilizing blades according to an embodiment.

FIG. 14 illustrates the fertilizing blades 180. At least one blade 180 may be attached near a rear axle of the apparatus 100, however, as outlined above, the fertilizer blades may be connected with one of the ripping blade and/or the soil fracturing discs. The fertilizing blades 180 may further aid in the tilling of the earth by, for example, loosening the soil or removing rocks or weeds from the trench created by the ripping blade 160. Although two fertilizing blades are shown in FIG. 14, it will be understood that any number of blades may be included depending on the conditions on the soil and the spacing between the blades 180.

In another aspect, there is provided a method for planting trees. The method includes loading a seedling handling system with seedlings to be planted. It is intended that the seedlings will be loaded into chambers of the seedling handling system via standard trays. A loader retrieves a plurality of seedlings from the seedling handling system and loads these seedlings into a seedling chute system. The seedling chute system releases the seedlings individually to be received by the planting head. The planting head is adapted to plant the seedling.

Figure 15A:
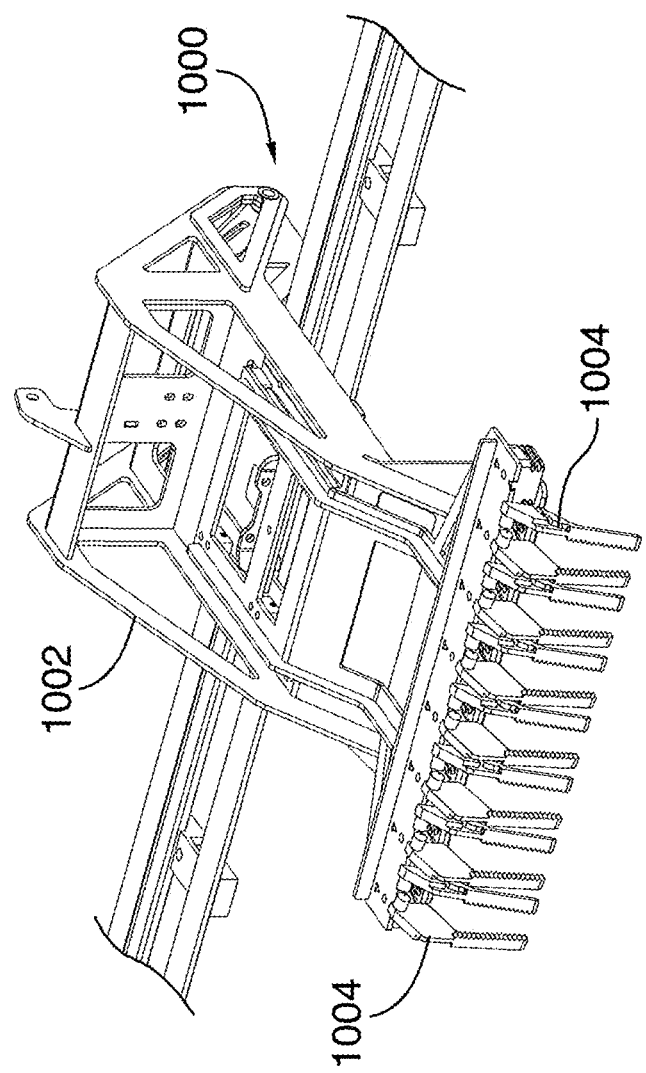

Turning to FIG. 15a, a perspective view of another embodiment of a loader is shown. The loader 1000 has a generally similar function as loader 450 of FIG. 4. The loader 1000 includes a frame 1002 that is attached or mounted to the seedling handling system (not shown). A controller controls the motion of the loader 1000 to retrieve seedlings, or rooted cuttings from a seedling tray 1200, such as schematically shown in FIGS. 16a to 16e.

In the current embodiment, as shown in FIGS. 15a to 15c, the loader 1000 includes seven (7) gripping mechanisms 1004 for retrieving up to seven seedlings at a time from the seedling tray. It will be understood that the loader 1000 can have any appropriate number of gripping mechanisms 1004 depending on the size of the seedling handling system. Each gripping mechanism 1004 includes a pair of arms 1006 (or finger portions) and an apparatus for moving the arms 1008 with respect to each other between open and closed positions. In one embodiment, the apparatus 1008 may be a spring portion while in another embodiment, the apparatus may be based on the characteristics of the material used to manufacture the gripping mechanism. As shown in FIG. 15b, the gripping mechanisms 1004 are in an open position while FIG. 15c shows the gripping mechanisms 1004 in a closed position. Based on control signals transmitted from the seedling handling system (or controller), the gripping mechanisms 1004 close about a seedling in order to retrieve the seedling from the seedling tray.

In the current embodiment, the gripping mechanisms 1004 include a set of teeth 1010 for improving the grip between the gripping mechanism 1004 and the seedling, however, it will be understood that the surface of the gripping mechanism 1004 that contacts the seedling may also be smooth. The pressure applied by each arm 1006 of the gripping mechanism 1004 against the seedling is preferably set so that there is little or no damage to the seedling or root plug as the seedling is being handled or retrieved. By having the gripping mechanisms 1004 grip the seedling at the root plug, the force being experienced by the seedling from the gripping mechanisms may be more evenly distributed.

In one method of operation, the closing of the arms may be seen as a two-stage process. Initially, assuming that the arms are in the open position, a mechanical force is applied to the apparatus for moving the arms 1008 whereby the arms move towards each other in a parallel manner. When the apparatus for moving the arms 1008 reaches a predetermined position, the continued application of the mechanical force causes the arms to slowly rotate with respect to each other to enable a stronger grip on the seedling whereby the lower ends of the arm portion pinch together to provide a "tighter" grip against the seedling than the upper ends of the arm portions.

Figure 16A:
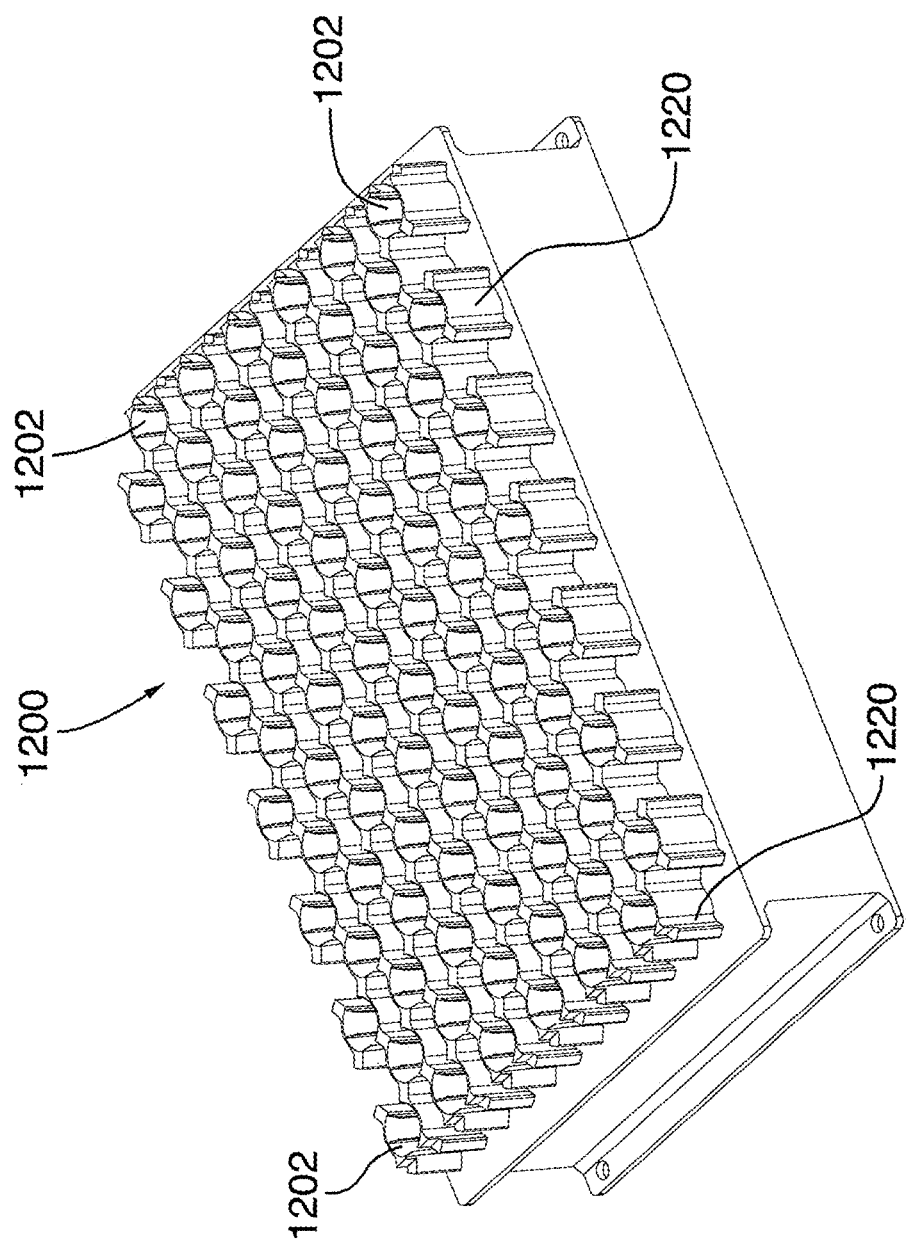
Figure 16B:
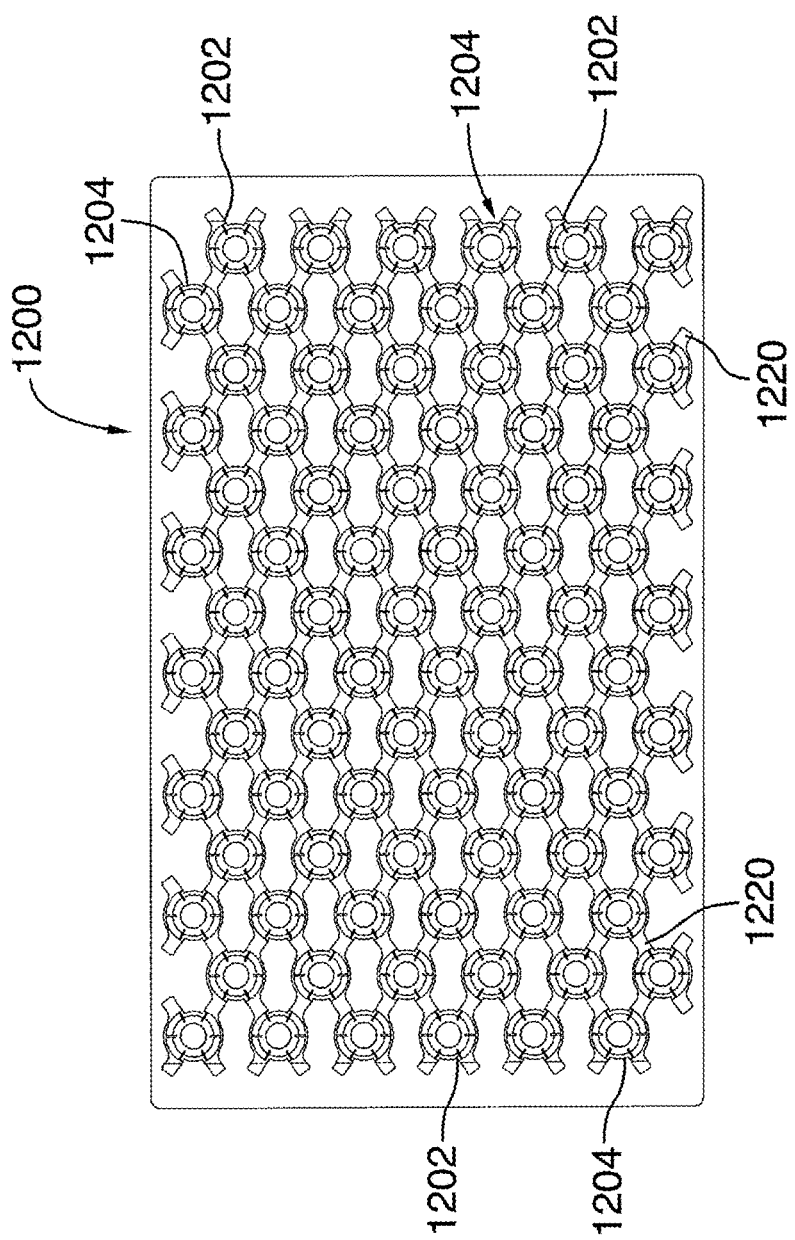
Figure 16C:
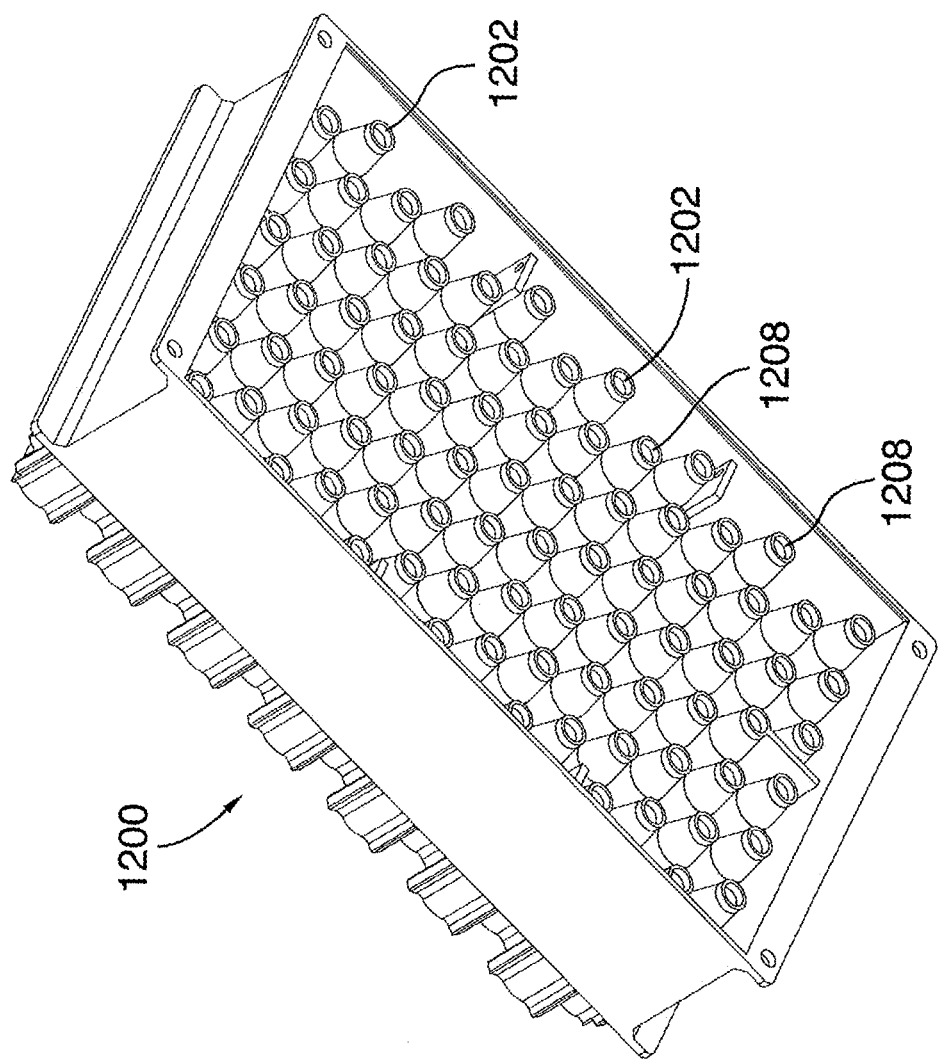
Figure 16E:
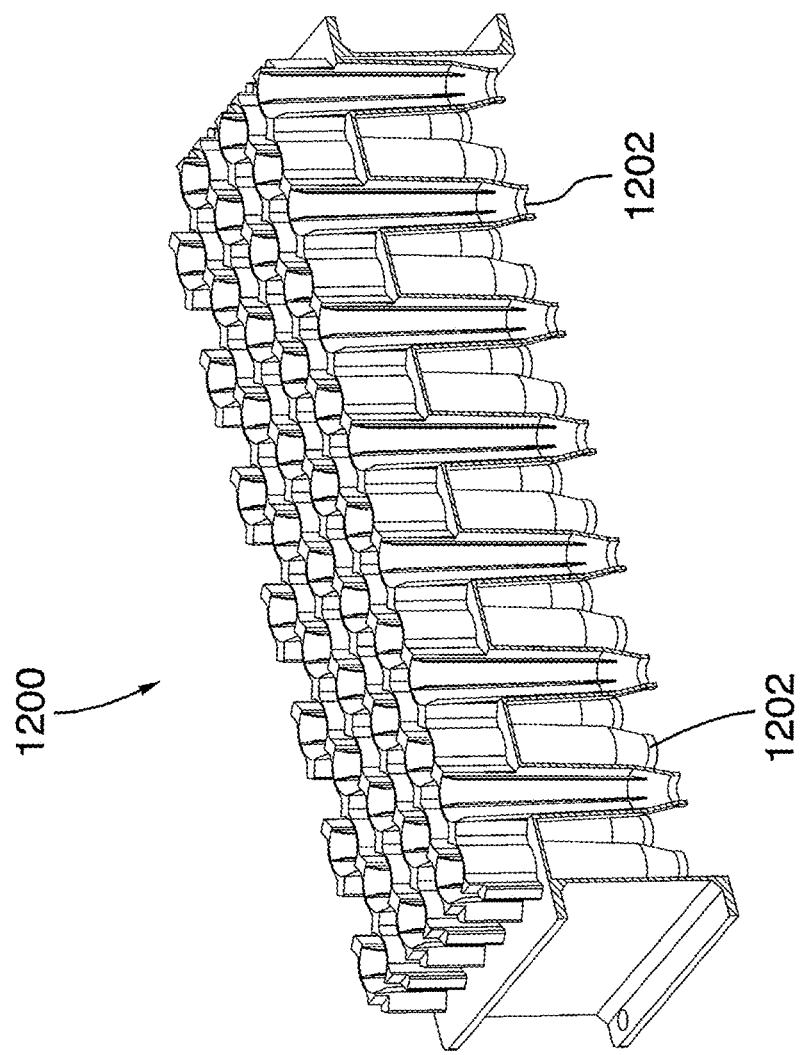

Turning to FIGS. 16a to 16e, various views of an embodiment of a seedling tray are shown. FIG. 16a is a top perspective view of the seedling tray 1200, FIG. 16b is another top perspective view of the seedling tray 1200, FIG. 16c is a bottom perspective view of the seedling tray 1200, FIG. 16d is another top perspective view of the seedling tray 1200 and FIG. 16e is a cross-section of the seedling tray 1200.

As shown in FIG. 16a, the seedling tray 1200 includes a set of seedling holders 1202 that are aligned with respect to each other. In the current embodiment, the holders 1202 are aligned in twelve (12) rows of seven (7) holders to produce a 12×7 matrix of seedling holders 1202. The alignment and setup of the seedling holders is configured to align with the setup of the loader 1000 and based on the characteristics of the seedling handling system. As will be understood, the number of rows and holders can be any number that is reasonable for such application. As can be seen, in this embodiment, each row of seven holders is offset from its adjacent rows of holders, however, they may also be aligned with each other. The alignment of the seedling holders 1202 can be better seen in FIG. 16b.

Figure 17:
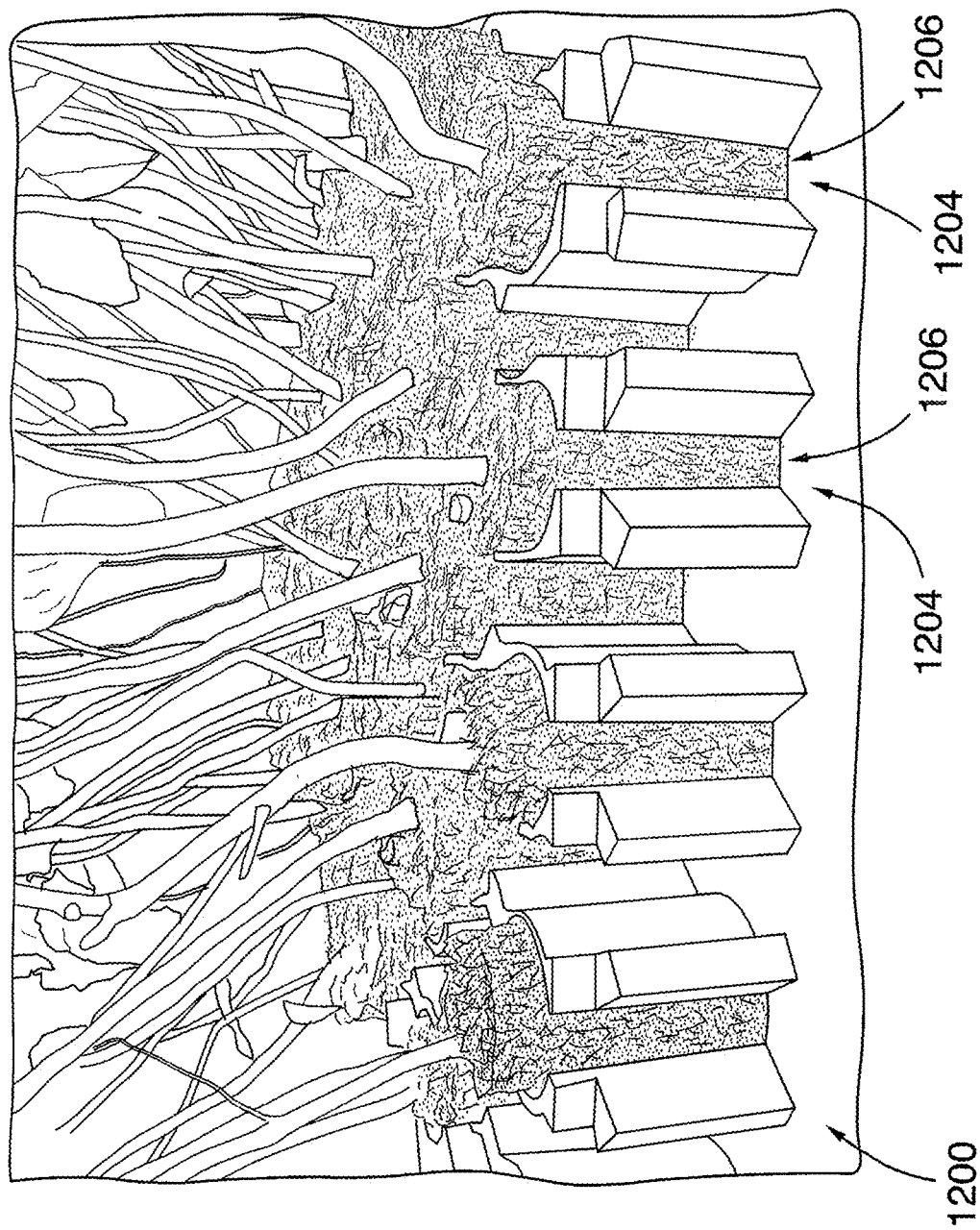
FIG. 17 is a photograph of a seedling tray with seedlings.

Each of the seedling holders 1202 includes a pair of openings 1204 at a side of the holder 1202 configured to allow the arms 1006 of the gripping mechanism 1004 to enter the seedling holder 1202 to grip and retrieve the seedling. The openings 1204 are more clearly shown with respect to FIG. 17 which is a close-up view of a seedling tray 1200 with seedlings 1206 stored within some of the seedling holders 1202.

In the current embodiment, the seedling tray 1200 includes a set of walls 1220 that define the seedling holders 1202. In an alternative embodiment, the seedling holders 1202 may be individual holders within the seedling tray 1200. In a preferred embodiment, the seedling tray 1200 is manufactured out of a plastic.

As can be seen in FIGS. 16c and 16e, the shape of each seedling holder 1202 is preferably conical with a bottom opening 1208 through which the roots of the seedling can extend. The bottom opening 1208 also allows for drainage, when necessary. The design of the seedling holders 1202 is such that when the loader 1000 is retrieving a set of seedlings, the gripping mechanisms 1004 grip the root plug of the seedling. Although not shown, within the seedling holders 1202 may be a set of protrusions or guiding apparatus for assisting in the positioning of the seedlings within the seedling holders 1202 such that the root plug of the seedling is aligned with the openings 1204 of the seedling holder 1202.

Figure 18:
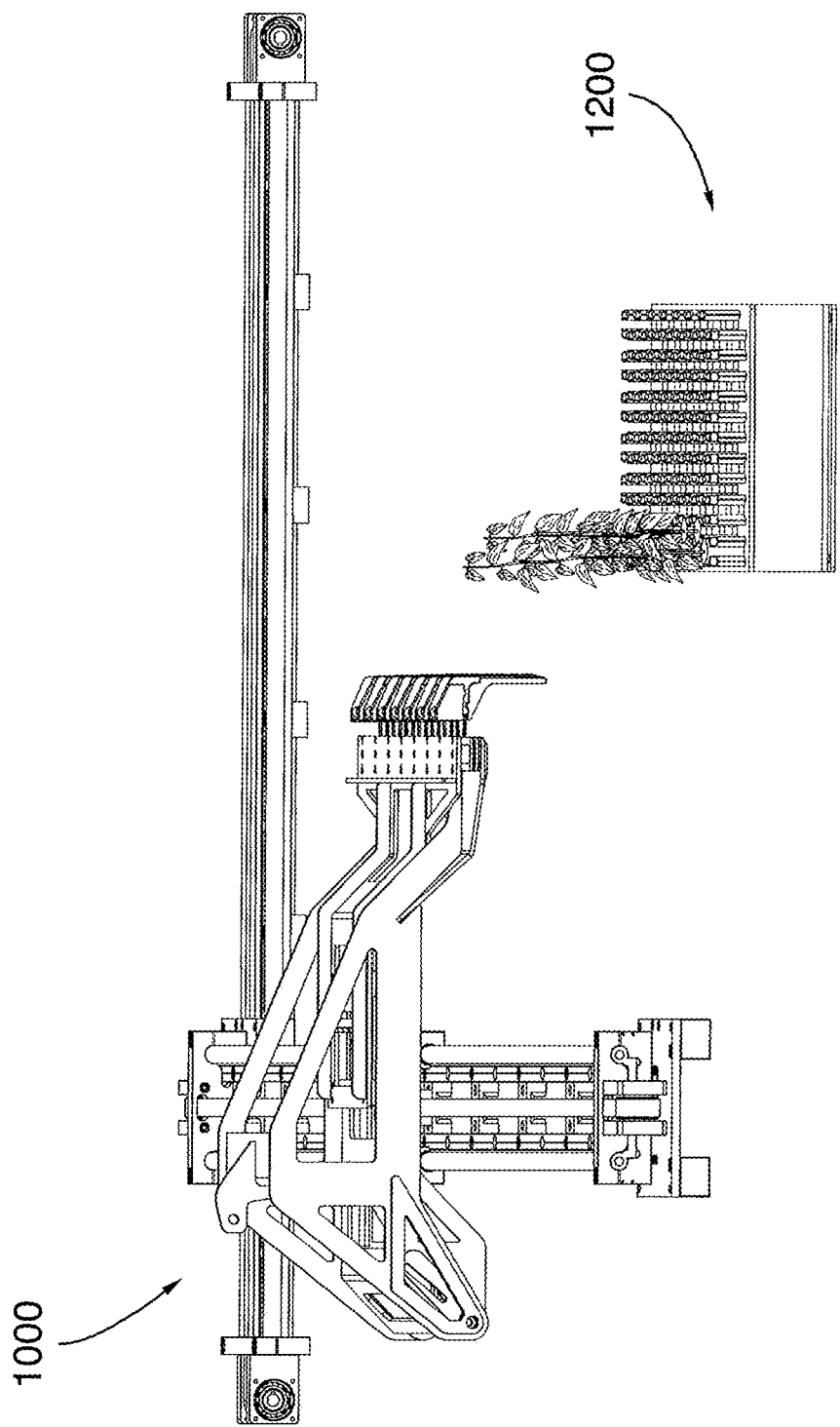
FIG. 18 is a side view of a loader and a seedling tray.

In operation, the seedling handling system controls the loader 1000 and moves the loader 1000 towards the seedling tray 1200 which is depicted in FIG. 18. Although not shown, it will be understood that the seedling tray 1200 is generally located within a chamber of the seedling handling system. In FIG. 18, the gripping mechanisms 1004 are in the open position. The seedling handling system (or the controller) positions the loader 1000 such that each of the arms 1006 of each gripping mechanism 1004 are aligned with the openings 1204 of a seedling holder 1202. This can be seen as the retrieval position of the loader 1000. In one embodiment, the loader 1000 may include a sliding mechanism whereby the gripping mechanisms 1004 are slid towards the seedling tray 1200 into the retrieval position. In another embodiment, the frame 1002 of the loader 1000 may be hinged whereby the gripping mechanisms 1004 are moved into a position above the seedling tray 1200 and then urged downwards to the retrieval position.

Figure 19:
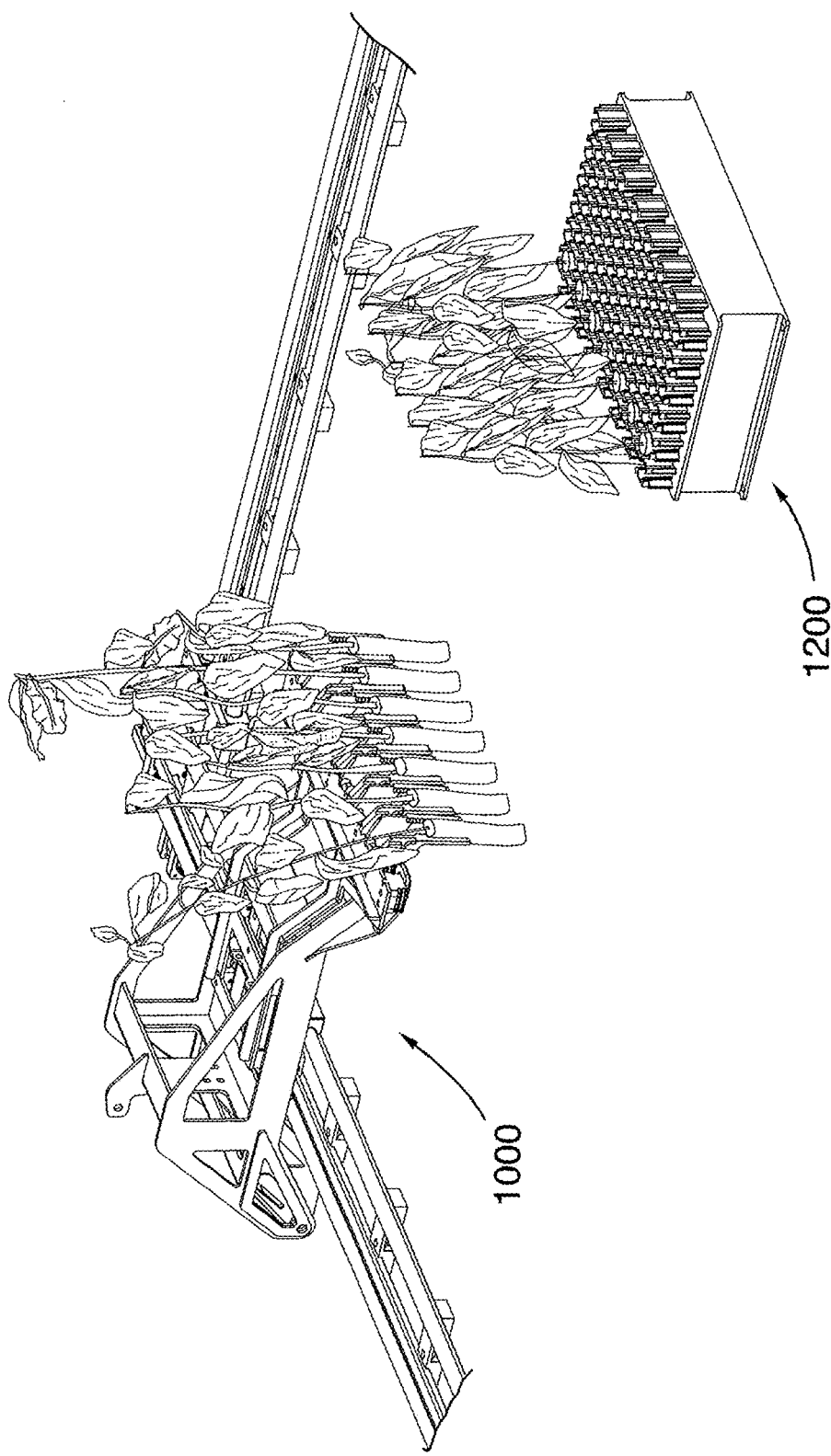
FIG. 19 is a view of a loader removing seedlings from a seedling tray.

After the loader is placed in the retrieval position, the arms 1006 of the individual gripping mechanisms 1004 are urged from the open to closed positions to grip and handle the seedlings. As outlined above, the arms 1006 preferably grip the seedlings at a root plug area of the seedling. When the apparatus for moving the arms is a spring portion, the movement of the arms may be achieved by biasing the spring portion. Although a spring portion is disclosed, it will be understood that other biasing apparatus are contemplated for opening and closing the arms 1006 of the gripping mechanism 1004. As mentioned above, it is desired that the pressure applied by the arms 1006 against the root plug of the seedling is such that there is limited or no damage applied to the root plug or the seedling. After the gripping mechanisms have gripped the seedlings, the loader 1000 is urged away, such as upwards and away, from the seedling tray 1200 in order to remove the seedlings from the seedling tray and insert the seedlings into the seedling chute as discussed above. FIG. 19 provides a view of the loader with a set of seedlings retrieved within its gripping mechanisms 1004 as it moves away from the seedling tray 1200.

Figure 20:
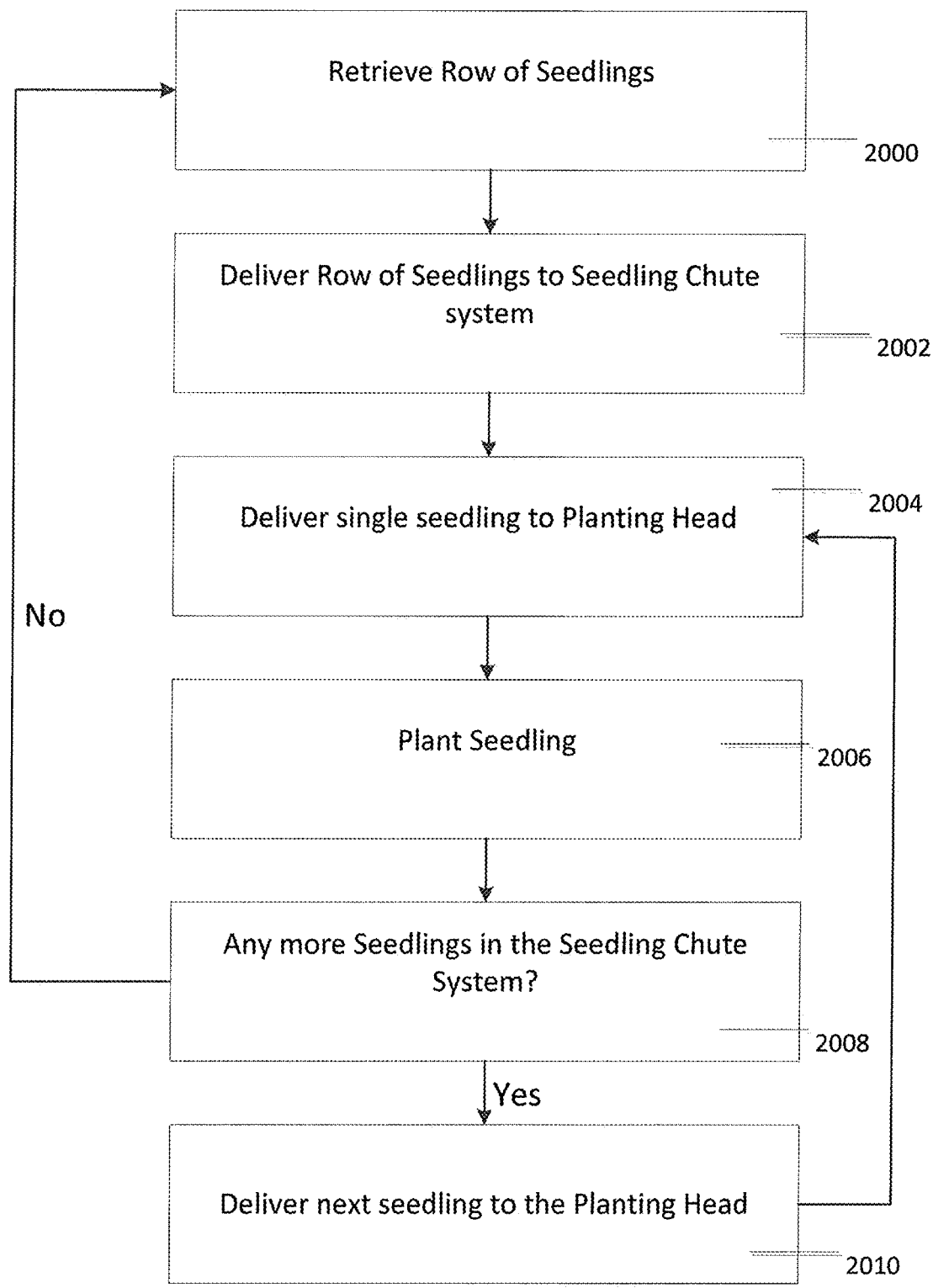
FIG. 20 is a flowchart outlining a method of planting trees.

Turning to FIG. 20, a flowchart outlining a method of planting seedlings is shown. It is assumed that the seedling handling system has been filled with seedlings trays. Initially, a row of seedlings are retrieved 2000, such as by the loader, for delivery to the seedling chute system 2002. In one embodiment, the loader delivers and drops the row of seedlings into the individual compartments within the chute system. The system then delivers a seedling to the planting head 2004. In one embodiment, the controller senses that the bladed pocket is empty and closed and then opens one of the compartments within the chute system, thereby allowing the seedling to enter the bladed pocket. As discussed above, this may be via gravity or via other forces, such as an air or water force.

The seedling is then planted by the planting head 2006. Concurrently, as the seedling is being planted, the system determines if there are any more seedlings within the seeding chute system 2008. If there are more seedlings, the controller releases another seedling into the planting head 2010 once it has determined that the bladed pocket is closed and ready to receive another seedling. If there are no more seedlings, the seedling chute system returns to receive a further row of seedlings from the seedling handling system. It will be understood that in one embodiment, as the row of seedlings are being individually planted, the seedling handling system may retrieve the next row of seedlings for delivery to the seedling chute system the planting of the seedlings can be performed on a continuous basis.

In the current flowchart, the different actions may be performed simultaneously and not necessarily in the order as shown in the flowchart. In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments described herein or elements thereof are implemented as a software routine, hardware circuit, firmware, or a combination thereof.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

I claim:

1. An apparatus for planting seedlings comprising:
a planting head for planting the seedlings;
a seedling handling system; and
a seedling chute system;
wherein seedlings are transferred from the seedling handling system to the planting head, via the seedling chute system, for automated individual planting of the seedlings by the planting head;
the planting head including a bladed pocket including a set of retractable blades and a body, wherein when the bladed pocket is in a closed position, the set of retractable blades and the body form a substantially continuous perimeter to hold a seedling and when the bladed pocket is in an open position, the set of retractable blades and the body retract relative to each other allowing the seedling to pass through the bladed pocket for automated individual planting; and
a frame portion for mounting the planting head to a vehicle, the frame portion including a mounting apparatus and a set of supports, each of the set of supports connected at one end to the mounting apparatus via mounting pivot points and at an opposite end to the body via planting pivot points and the set of supports are configured such that the body and bladed pocket remain substantially vertical during operation and, when the bladed pocket is in the ground, the set of supports pivot at the mounting pivot points and planting pivot points to extend in a rearward direction to allow the bladed pocket to remain stationary while the vehicle continues to move forward.

2. The apparatus of claim 1 wherein the set of supports are connected via spherical bushings to the mounting apparatus.

3. The apparatus of claim 1 wherein the set of supports are connected to the body via spherical bushings.

4. The apparatus of claim 1 wherein the planting head further comprises at least one tamper portion.

5. The apparatus of claim 4 wherein the planting head further comprises a set of pumps for controlling the at least one tamper portion.

6. The apparatus of claim 5 wherein the set of pumps are pneumatic or hydraulic pumps.

7. The apparatus of claim 1 wherein the planting head further comprises a set of pumps for controlling the retractable blades.

8. The apparatus of claim 1 wherein the seedling handling system comprises:
a set of chambers for receiving a set of seedling trays, wherein the set of seedling trays house a set of seedlings arranged in individual rows within each seedling tray.

9. The apparatus of claim 8 wherein adjacent rows within each seedling tray are offset with respect to each other.

10. The apparatus of claim 8 wherein the set of chambers are controlled by a controller to position a new seedling tray in a loading position once a previous seedling tray is emptied.

11. The apparatus of claim 1 wherein the seedling chute system comprises a loader wherein the loader includes:
a robotic arm;
a set of gripping mechanisms attached to the robotic arm; and
a sliding mechanism allowing the loader to move with respect to the seedling handling system to retrieve a row of seedlings.

12. The apparatus of claim 11 wherein the gripping mechanisms comprise:
a pair of finger portions; and
an apparatus for moving the pair of finger portions towards and away from each other.

13. The apparatus of claim 1 further comprising a ripping blade.

14. The apparatus of claim 1 further comprising at least one soil fracturing disc.

15. The apparatus of claim 1 further comprising a set of fertilizer blades.

16. The apparatus of claim 15 further comprising a ripping blade where the set of fertilizer blades is integrated with the ripping blade.

17. The apparatus of claim 1 further comprising a water delivery system for watering the seedlings after they have been planted.

18. The apparatus of claim 1 wherein the seedling chute system is configured to receive a plurality of seedlings and deliver the plurality of seedlings to the planting head individually.

19. A vehicle provided with the apparatus of claim 1.

* * * * *